United States Patent
Morioka et al.

(10) Patent No.: US 12,337,666 B2
(45) Date of Patent: Jun. 24, 2025

(54) DOOR OPENING AND CLOSING DEVICE

(71) Applicant: AISIN CORPORATION, Kariya (JP)

(72) Inventors: Toshimitsu Morioka, Kariya (JP); Tomohito Kiryu, Kariya (JP)

(73) Assignee: AISIN CORPORATION, Kariya (JP)

( * ) Notice: Subject to any disclaimer, the term of this patent is extended or adjusted under 35 U.S.C. 154(b) by 301 days.

(21) Appl. No.: 17/933,706

(22) Filed: Sep. 20, 2022

(65) Prior Publication Data
US 2023/0134202 A1    May 4, 2023

(30) Foreign Application Priority Data

Oct. 28, 2021    (JP) .................................. 2021-176528

(51) Int. Cl.
*B60J 5/10*    (2006.01)
*E05F 15/622*    (2015.01)

(52) U.S. Cl.
CPC ............. *B60J 5/106* (2013.01); *E05F 15/622* (2015.01); *E05Y 2900/546* (2013.01)

(58) Field of Classification Search
CPC ....... B60J 5/106; B60J 5/10; E05Y 2900/546; E05C 17/32; E05F 15/63; E05F 15/652; E05F 15/622
USPC .................... 296/56, 106, 146.8, 201, 146.11
See application file for complete search history.

(56) References Cited

U.S. PATENT DOCUMENTS

| | | | | |
|---|---|---|---|---|
| 4,157,845 A | * | 6/1979 | Queveau | E06B 3/921 296/220.01 |
| 4,620,743 A | * | 11/1986 | Eke | B60J 5/12 49/197 |
| 5,997,072 A | * | 12/1999 | Parkinson | B60J 5/12 296/146.8 |
| 2009/0102221 A1 | * | 4/2009 | Andre | B60J 5/104 296/56 |
| 2023/0241949 A1 | * | 8/2023 | Fuentes | B60J 5/106 |

FOREIGN PATENT DOCUMENTS

| | | | |
|---|---|---|---|
| DE | 103 31 692 A1 | 2/2005 | |
| DE | 10 2009 001 227 A1 | 9/2010 | |
| EP | 1 764 248 A2 | 3/2007 | |
| EP | 1634745 B1 * | 1/2010 | ............ B60J 1/1884 |

(Continued)

OTHER PUBLICATIONS

KR2002-0039862 Text (Year: 2002).*

(Continued)

*Primary Examiner* — Dennis H Pedder

(74) *Attorney, Agent, or Firm* — Oblon, McClelland, Maier & Neustadt, L.L.P.

(57) ABSTRACT

A door opening and closing device includes a slider and a main link mechanism. The slider moves along a roof of the vehicle body in a front-rear direction, while supporting a proximal end portion of a back door in such a way as to be rotatable around an axis extending in a width direction. The main link mechanism includes one end and an opposite end rotatably coupled to the vehicle body and the back door, respectively. The main link mechanism adjusts a posture of the back door, depending on a door opening degree by changing a distance between a coupling point to the vehicle body and a coupling point to the back door. The main link mechanism decreases the distance as the door opening degree becomes larger.

9 Claims, 14 Drawing Sheets

(56) References Cited

FOREIGN PATENT DOCUMENTS

| | | |
|---|---|---|
| FR | 2 932 124 A1 | 12/2009 |
| FR | 3 040 925 A1 | 3/2017 |
| KR | 20020039862 A * | 5/2002 |

OTHER PUBLICATIONS

EP1634745 Text (Year: 2010).*
Extended European Search Report issued on Mar. 3, 2023 in European Patent Application 22204482.8, 8 pages.

* cited by examiner

DOOR OPENING AND CLOSING DEVICE

CROSS REFERENCE TO RELATED APPLICATIONS

This application is based on and claims priority under 35 U.S.C. § 119 to Japanese Patent Application No. 2021-176528, filed on Oct. 28, 2021, the entire content of which is incorporated herein by reference.

TECHNICAL FIELD

This disclosure generally relates to a door opening and closing device.

BACKGROUND DISCUSSION

Conventionally, there is known a vehicle that includes a vehicle body including a door opening at a rear portion and that includes a back door opening and closing the door opening. In such a vehicle, the vehicle body includes a hinge that couples, to each other, a portion on an upper side of the door opening and an upper end portion of the back door. The back door rotates around an axis of the hinge, and thereby moves between a fully closing position of fully closing the door opening and a fully opening position of fully opening the door opening.

EP1764248A (Reference 1) discloses a vehicle in which a hinge rotatably supporting a back door is movable in a front-rear direction along a roof of a vehicle body. In this vehicle, accompanying an opening movement of the back door, the hinge is moved to a front side while the back door is rotated. In this manner, in the vehicle, a rearward overhang at a time of opening and closing movements of the back door is reduced.

In a back door as described above, there has been room for improvement in terms of further reducing an overhang at a time of opening and closing movements.

A need thus exists for a door opening and closing device which is not susceptible to the drawback mentioned above.

SUMMARY

A door opening and closing device that solves the above-described problem is applied to a vehicle that includes a vehicle body and a door. The vehicle body includes a door opening. The door opens and closes the door opening. A part in the door corresponding to an upper end portion of the door opening when the door is at a fully closing position of fully closing the door opening is defined as a proximal end portion of the door. The door opening and closing device includes a slider and a main link mechanism. The slider moves along a roof of the vehicle body in a direction intersecting with a width direction of the door, in a state of supporting the proximal end portion of the door in such a way as to be rotatable around an axis extending in the width direction. The main link mechanism includes one end rotatably coupled to the vehicle body and an opposite end rotatably coupled to the door. The main link mechanism adjusts a posture of the door, depending on a door opening degree by changing a distance between coupling points that is a distance between the coupling point to the vehicle body and the coupling point to the door. The main link mechanism decreases the distance between the coupling points as the door opening degree becomes larger.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

The following describes one embodiment of a vehicle that includes a door opening and closing device.

<Vehicle 10>

Figure 1:
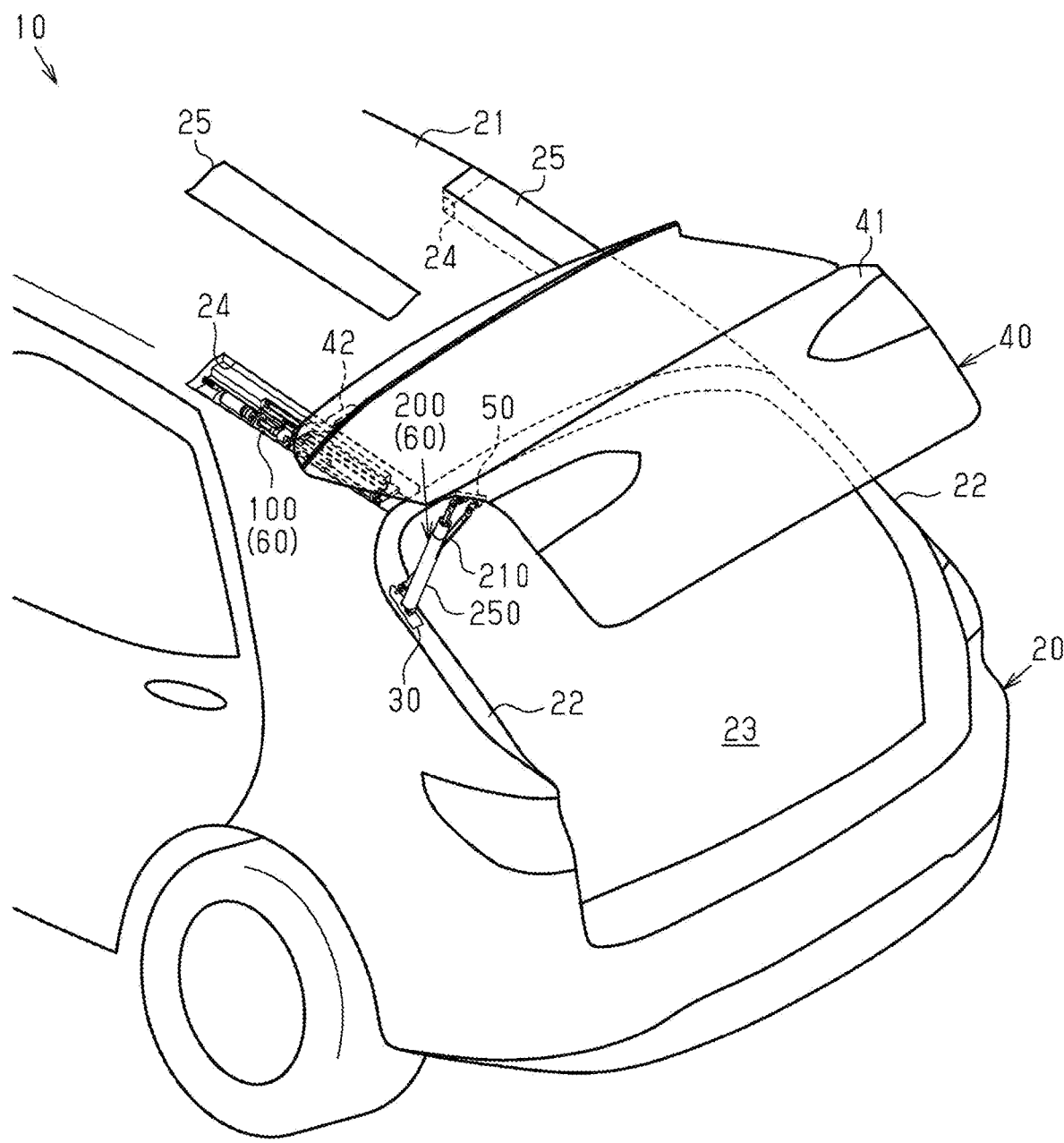
FIG. 1 is a perspective view of a vehicle rear portion.
Figure 2:
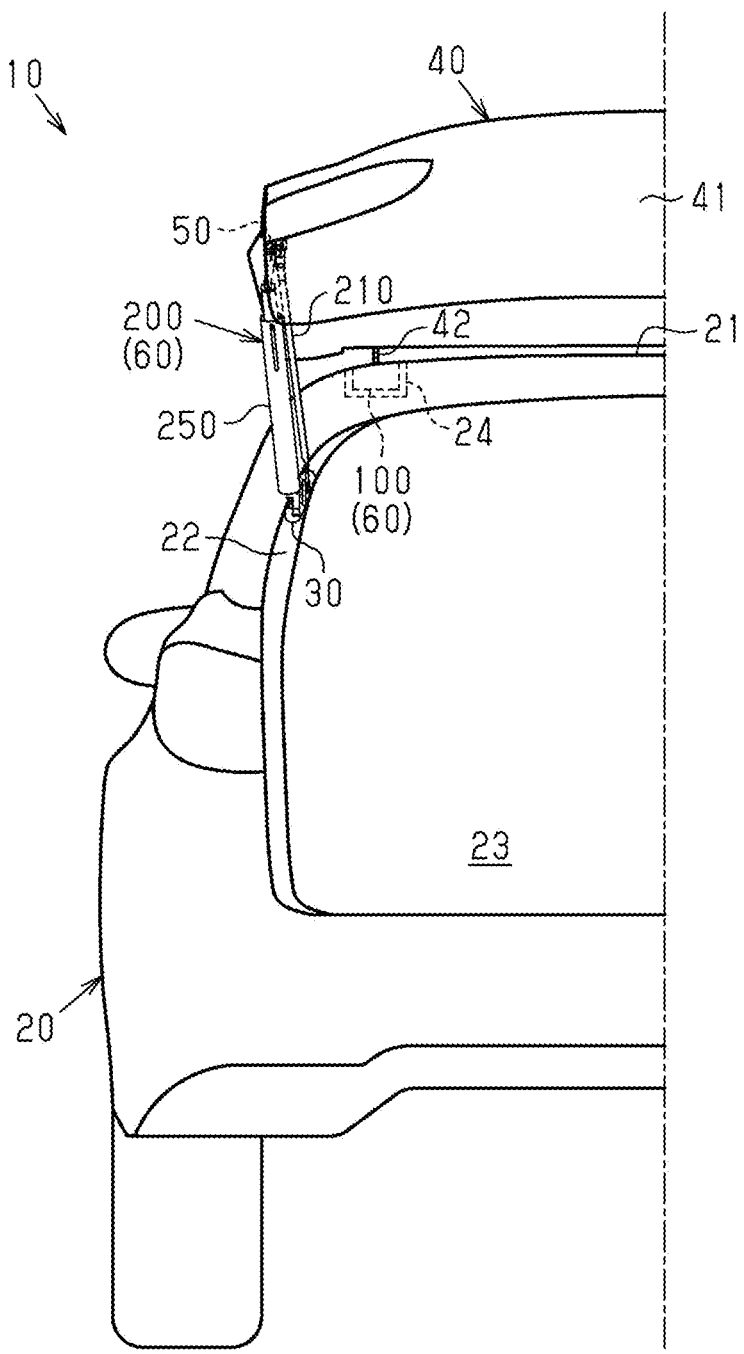
FIG. 2 is an elevational view of the vehicle rear portion.

As illustrated in FIG. 1 and FIG. 2, a vehicle 10 includes a vehicle body 20, a back door 40, and a door opening and closing device 60. As illustrated in FIG. 1, the vehicle 10 is what is called an SUV type vehicle. In another embodiment, as long as the vehicle 10 includes the back door 40, the vehicle 10 may be a minivan type vehicle, a sedan type vehicle, or any other type of vehicle.

<Vehicle Body 20>

As illustrated in FIG. 1 and FIG. 2, the vehicle body 20 includes a roof 21 that forms a ceiling portion of the vehicle body 20, two rear pillars 22 that extend from the roof 21, and a door opening 23 that is open rearward. Although illustrations of configurations on one side are omitted in FIG. 1 and FIG. 2, the vehicle body 20 includes two brackets 30 fixed to the two respective rear pillars 22.

The roof 21 includes two accommodation recess portions 24 whose depth directions are each downward, and two cover panels 25 that cover the two accommodation recess portions 24. The accommodation recess portions 24 are located at a rear end portion of the roof 21 and at both width-direction end portions of the roof 21. When viewed from an upper side, the accommodation recess portion 24 has a rectangular shape whose longitudinal direction is a front-rear direction and whose lateral direction is the width direction.

The rear pillars 22 are parts of a frame constituting the vehicle body 20. The two rear pillars 22 extend in an up-down direction while being spaced apart from each other in the width direction. The two rear pillars 22 are connected to both width-direction end portions of the roof 21, at positions near a rear end of the roof 21. The rear pillars 22 may be formed integrally with quarter panels.

When the vehicle body 20 is viewed from a rear side, the door opening 23 has a shape close to a rectangle whose longitudinal direction is the width direction and whose lateral direction is the up-down direction. Specifically, in the door opening 23, a width-direction length of a lower edge is longer than a width-direction length of an upper edge. In other words, the door opening 23 has a trapezoidal shape when the vehicle body 20 is viewed from a rear side. The door opening 23 is located between the two rear pillars 22 in the width direction.

The bracket 30 is a part coupled to the door opening and closing device 60. The bracket 30 is described later together with the door opening and closing device 60.

<Back Door 40>

As illustrated in FIG. 1 and FIG. 2, the back door 40 is moved between a fully closing position of fully closing the door opening 23 and a fully opening position of fully opening the door opening 23. A door opening degree becomes minimum when the back door 40 is at the fully closing position, and becomes maximum when the back door 40 is at the fully opening position. In the following description, a part of the back door 40 corresponding to an upper end portion of the door opening 23 when the back door 40 is at the fully closing position is referred to as a proximal end portion of the back door 40, and a part of the back door 40 corresponding to a lower end portion of the door opening 23 when the back door 40 is at the fully closing position is referred to as a distal end portion of the back door 40. When the back door 40 is at the fully closing position, the proximal end portion of the back door 40 is an upper end portion, and the distal end portion of the back door 40 is a lower end portion.

The back door 40 includes a door body 41 covering the door opening 23. Although illustrations of configurations on one side are omitted in FIG. 1 and FIG. 2, the back door 40 includes two coupling arms 42 that extend from the door body 41, and two stays 50 that are fixed to the door body 41. The door body 41 has a shape corresponding to the door opening 23. The two coupling arms 42 extend from the proximal end portion of the door body 41, in a state of being spaced apart from each other in the width direction. The stay 50 is a part coupled to the door opening and closing device 60. The stay 50 is described later together with the door opening and closing device 60. In this embodiment, the width direction of the vehicle 10 is also a width direction of the back door 40.

<Door Opening and Closing Device 60>

Although illustrations of configurations on one side are omitted in FIG. 1 and FIG. 2, the door opening and closing device 60 includes two drive mechanisms 100 that drive the back door 40, and two positioning mechanisms 200 that position the back door 40, depending on a door opening degree. The two drive mechanisms 100 are accommodated in the accommodation recess portions 24 of the roof 21, in a state of being spaced apart from each other in the width direction. The two positioning mechanisms 200 are each arranged between the rear pillar 22 and the back door 40, in a state where the positioning mechanisms 200 are spaced apart from each other in the width direction. The two drive mechanisms 100 are configured in such a way as to be symmetrical to each other in the width direction, and the two positioning mechanisms 200 configured in such a way as to be symmetrical to each other in the width direction. For this reason, the following describes the drive mechanism 100 and the positioning mechanism 200 on a left side in the vehicle 10.

<Drive Mechanism 100>

Figure 3:
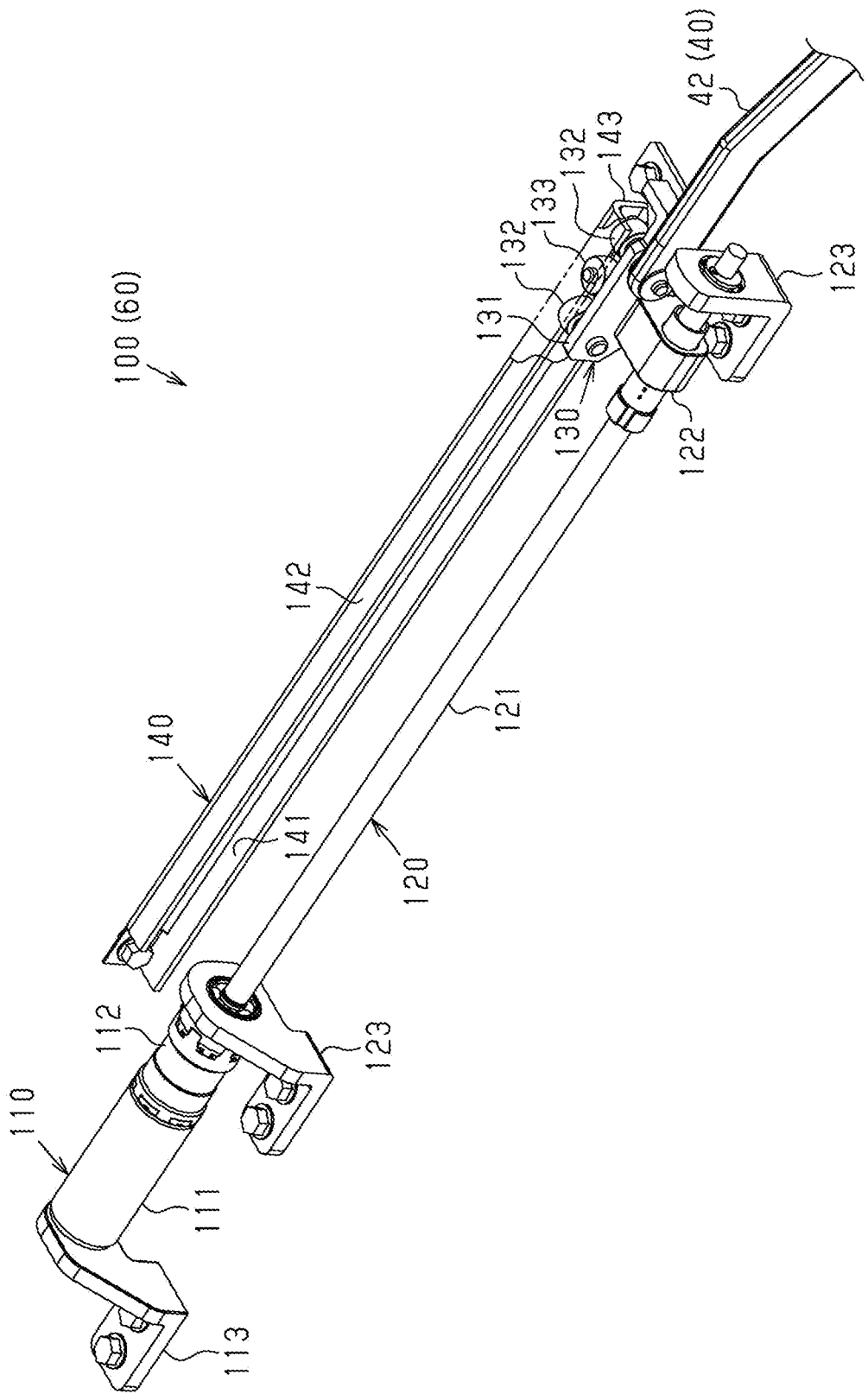
FIG. 3 is a perspective view of a drive mechanism of a door opening and closing device.

As illustrated in FIG. 3, the drive mechanism 100 includes an actuator 110, a linear motion mechanism 120, a slider 130, and a guide rail 140.

As illustrated in FIG. 3, the actuator 110 includes an electric motor 111, a reduction mechanism 112 that reduces a rotational speed of an output shaft of the electric motor 111, and a support portion 113 that supports the electric motor 111. The actuator 110 is installed in the accommodation recess portion 24 of the roof 21. The linear motion mechanism 120 is what is called a feed screw mechanism. The linear motion mechanism 120 includes a screw shaft 121 that rotates based on power transmitted from the actuator 110, a nut 122 that is screwed onto the screw shaft 121, and two support portions 123 that rotatably support the screw shaft 121. The screw shaft 121 extends in the front-rear direction. The two support portions 123 support respective both longitudinal-direction end portions of the screw shaft 121. The nut 122 is coupled to the slider 130, and thereby, a degree of rotational freedom of the nut 122 around an axis of the screw shaft 121 is restricted. Accordingly, the nut 122 moves in an axial direction of the screw shaft 121, accompanying rotation of the screw shaft 121. A direction in which the nut 122 moves varies depending on a rotational direction of the screw shaft 121. The actuator 110 corresponds to one example of "a slider actuator".

The slider 130 includes a support plate 131 that rotatably supports the back door 40, and two main rollers 132 and a sub-roller 133 that are rotatably supported by the support plate 131. The support plate 131 is joined to the coupling arm 42 of the back door 40 by a pin whose axial direction is the width direction. In this regard, it can be said that the back door 40 is supported by the slider 130 in such a way as to be rotatable around an axis extending in the width direction. Each axial direction of the two main rollers 132 is the width direction, and an axial direction of the sub-roller 133 is the up-down direction. The sub-roller 133 is located between the two main rollers 132 in the front-rear direction. The support plate 131 is coupled to the nut 122 in the width direction. Accordingly, when the nut 122 moves in the axial direction of the screw shaft 121, the slider 130 moves together with the nut 122.

The guide rail 140 has a long-rod shape. The guide rail 140 is fixed to the accommodation recess portion 24 of the roof 21 in such a way as to be along the screw shaft 121. In this regard, the guide rail 140 extends along roof 21. Herein, the matter that the guide rail 140 extends along the roof 21 does not mean only that the guide rail 140 extends parallel to the roof 21. The guide rail 140 may linearly extend in the front-rear direction, or may extend in the front-rear direction while curving along the roof 21. The guide rail 140 includes a bottom wall 141, an upper wall 142 that faces the bottom wall 141 in the up-down direction, and a side wall 143 that connects the bottom wall 141 and the upper wall 142 to each other in the up-down direction. The guide rail 140 accommodates the two main rollers 132 and the sub-roller 133 of the slider 130. When the slider 130 moves in the axial direction of the screw shaft 121 together with the nut 122, the two main rollers 132 rotate in a state of contacting with the bottom wall 141 or the upper wall 142 of the guide rail 140. Meanwhile, the sub-roller 133 rotates in a state of contacting with the side wall 143 of the guide rail 140.

In this manner, in the drive mechanism 100, the slider 130 can move in the longitudinal direction of the guide rail 140, in a state of rotatably supporting the proximal end portion of the back door 40. In other words, the slider 130 can move along the roof 21 in a direction intersecting with the width direction. The matter that the slider 130 moves along the roof 21 does not mean only a movement parallel to the roof 21, as mentioned above in the description of the guide rail 140.

<Positioning Mechanism 200>

Figure 4:
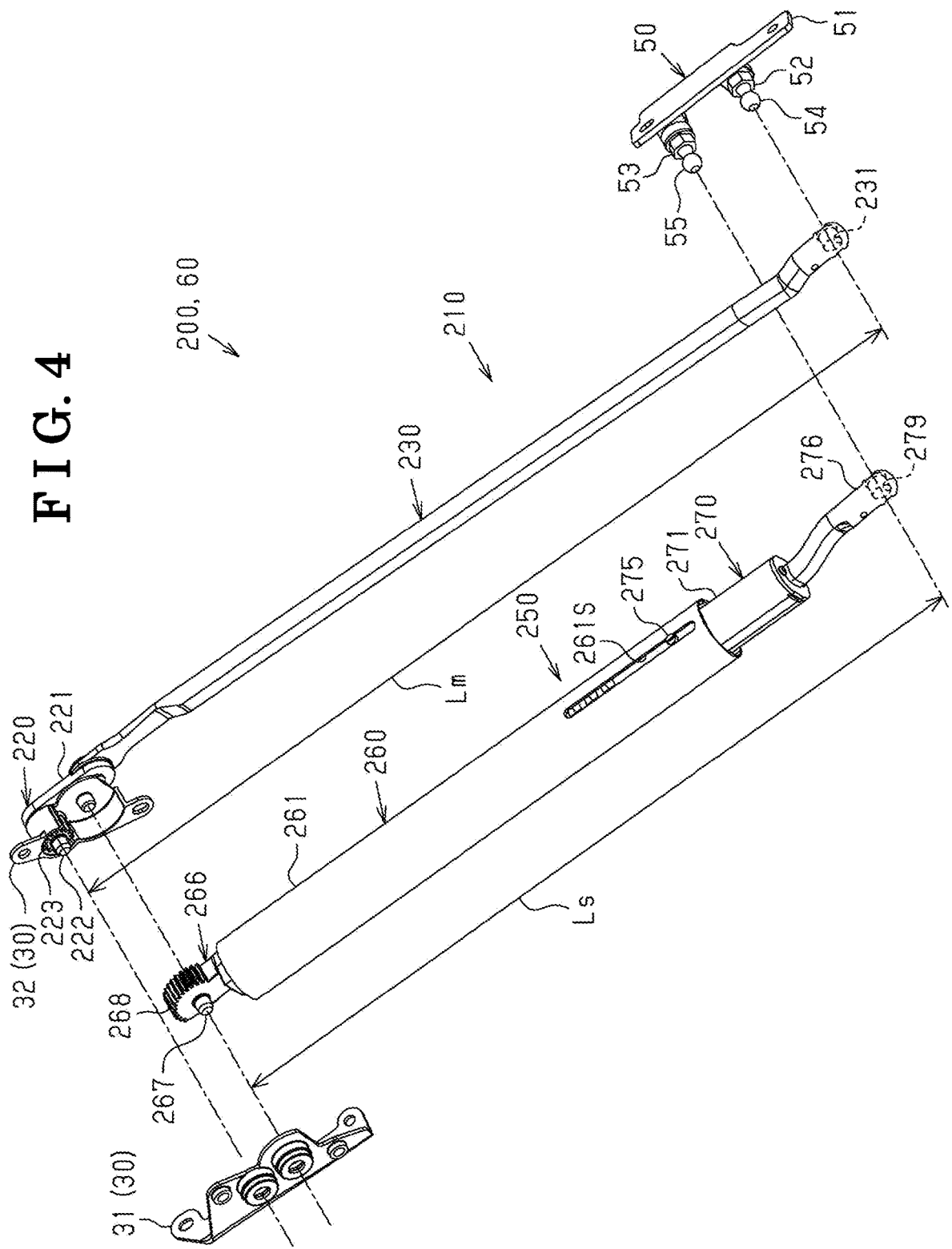
FIG. 4 is an exploded perspective view of a positioning mechanism of the door opening and closing device.
Figure 5:
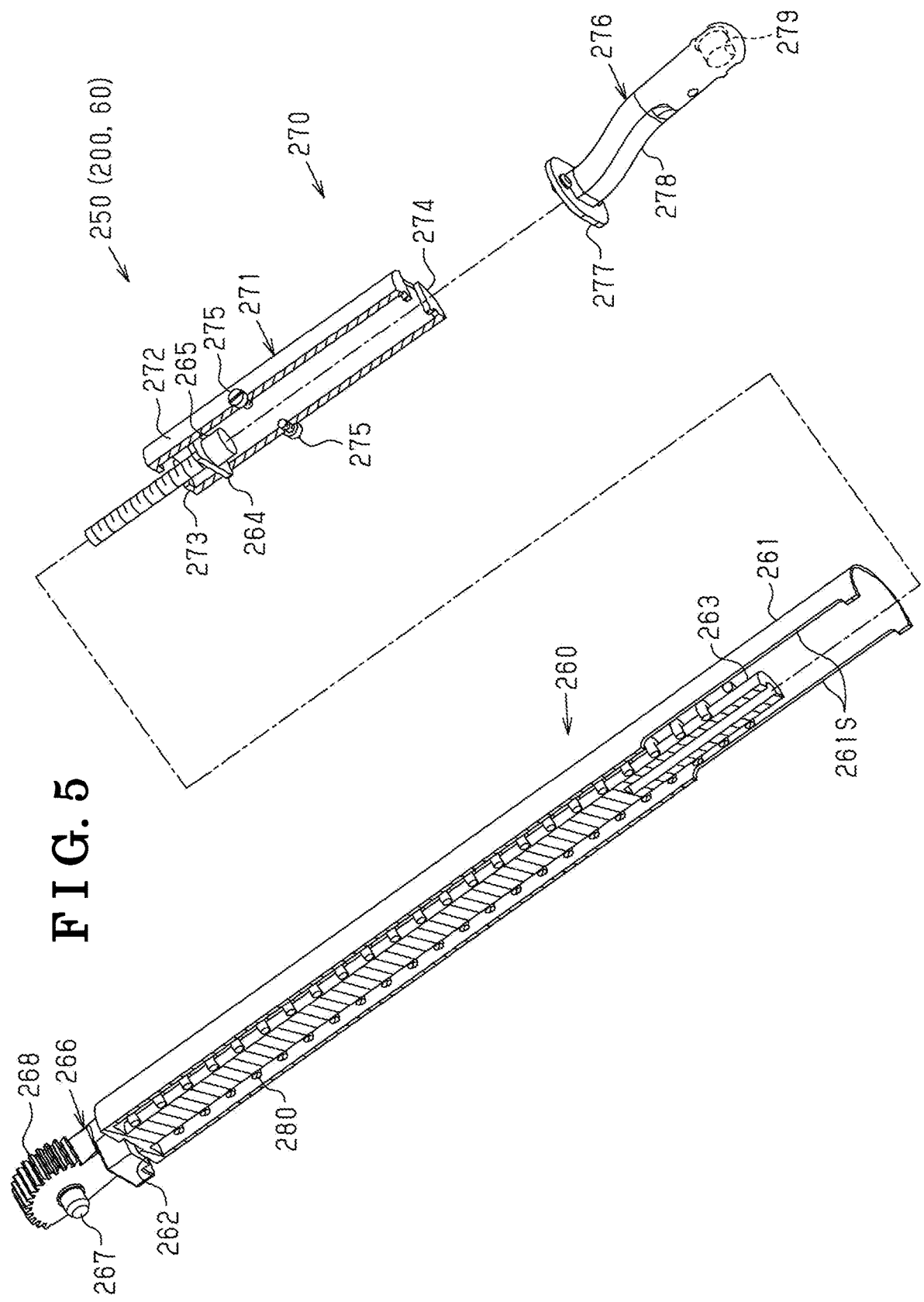
FIG. 5 is an exploded perspective view of a sub-link mechanism of the positioning mechanism.

As illustrated in FIG. 4 and FIG. 5, the positioning mechanism 200 includes a main link mechanism 210 that adjusts a posture of the back door 40, depending on a door opening degree, and a sub-link mechanism 250 that transmits a door opening degree to the main link mechanism 210.

<Main Link Mechanism 210>

As illustrated in FIG. 4 and FIG. 5, the main link mechanism 210 includes a first link 220 that is crank-shaped, and a second link 230 that is rod-shaped. In the following description, in a longitudinal direction of the main link mechanism 210, an end portion coupled to the vehicle body 20 is also referred to as a proximal end portion, and an end portion coupled to the back door 40 is also referred to as a distal end portion.

The first link 220 includes a link body 221 that has a plate shape, a driven shaft 222 that extends in a plate thickness direction from the link body 221, and a driven gear 223 that rotates integrally with the driven shaft 222. The driven shaft 222 extends from one end portion of the link body 221. The second link 230 includes, at one end portion thereof, a first socket 231 that is a ball socket. The second link 230 is longer than first link 220. An end portion that is included in the second link 230 and at which the first socket 231 is not provided and an end portion that is included in the first link 220 and at which the driven shaft 222 is not provided are coupled to each other in such a way as to be rotatable relative to each other.

<Sub-Link Mechanism 250>

As illustrated in FIG. 4 and FIG. 5, the sub-link mechanism 250 includes a fixed link 260, a movable link 270 that moves relative to the fixed link 260, and a coil spring 280 that biases the movable link 270. In the following description, in the sub-link mechanism 250, a longitudinal-direction end portion coupled to the vehicle body 20 is referred to also as a proximal end portion, and a longitudinal-direction end portion coupled to the back door 40 is referred to also as a distal end portion.

As illustrated in FIG. 5, the fixed link 260 includes an outer tube 261 that has a tubular shape, a bottom wall 262 that closes an opening on a proximal end side in the outer tube 261, and a shaft body 263 that extends from the bottom wall 262 along the outer tube 261. The fixed link 260 includes a fixed plate 264 that is fixed to a distal end of the shaft body 263, a fixing screw 265 that fixes the fixed plate 264 to the distal end of the shaft body 263, and a transmission portion 266 that is a part engaging with the main link mechanism 210.

The outer tube 261 includes, at a distal end portion thereof, two guide grooves 261S extending in an axial direction of the outer tube 261. The two guide grooves 261S face each other in a radial direction of the outer tube 261. An outer diameter of the shaft body 263 is smaller than an inner diameter of the outer tube 261, and a length of the shaft body 263 is shorter than a length of the outer tube 261. The shaft body 263 is accommodated inside the outer tube 261, in a state where a gap is provided between the shaft body 263 and the outer tube 261. The fixed plate 264 has a rectangular-plate shape. The fixed plate 264 is fixed to the distal end of the shaft body 263 in such a way that a plate thickness direction thereof is an axial direction of the shaft body 263. The transmission portion 266 is integrated with the bottom wall 262. The transmission portion 266 includes a cylindrical drive shaft 267 and a drive gear 268 that rotates integrally with the drive shaft 267. In this embodiment, a rotational axis of the drive gear 268 and an axis of the outer tube 261 are in a relation of a skew position.

As illustrated in FIG. 5, the movable link 270 includes an inner tube 271 that has a tubular shape, two guide pins 275 that are fixed to the inner tube 271, and an extension part 276 that is fixed to one end portion of the inner tube 271.

Figure 6:
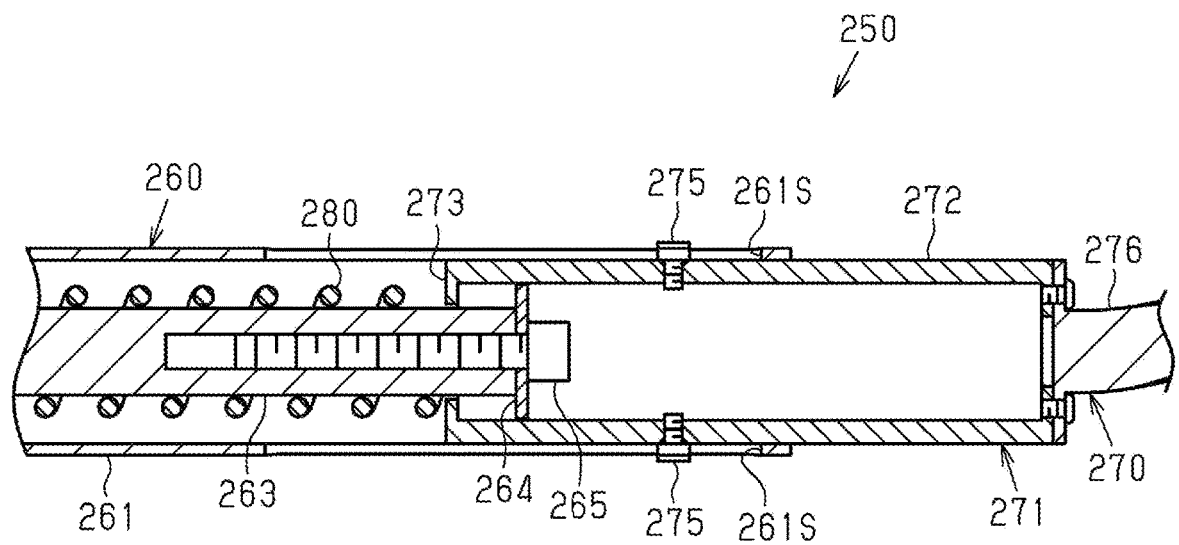
FIG. 6 is a sectional view of the sub-link mechanism.

The inner tube 271 includes a perimeter wall 272 whose cross section perpendicular to an axial direction thereof is elliptical, and two partition walls 273 and 274 that cover both end portions of the perimeter wall 272. The partition walls 273 and 274 each include a penetration hole that is rectangular when viewed in an axial direction of the inner tube 271. As illustrated in FIG. 4 and FIG. 5, the inner tube 271 is accommodated in the fixed link 260, and the inner tube 271 accommodates the fixed plate 264. Accordingly, as illustrated in FIG. 6, when the inner tube 271 moves in a direction of projecting out from the fixed link 260, the partition wall 273 of the inner tube 271 is caught by the fixed plate 264. In this manner, the movable link 270 is prevented from falling off from the fixed link 260.

As illustrated in FIG. 5 and FIG. 6, the two guide pins 275 are provided at positions facing each other in a radial direction of the inner tube 271. As illustrated in FIG. 4 and FIG. 6, in a state where the inner tube 271 is accommodated in the fixed link 260, the two guide pins 275 are accommodated in the two respective guide grooves 261S of the outer tube 261. The two guide pins 275 engage with the two respective guide grooves 261S, and thereby, the movable link 270 is allowed to move in the axial direction relative to the fixed link 260, and is restricted from rotating around the axis relative to the fixed link 260.

In a sectional view illustrated in FIG. 6, there is substantially no gap between the shaft body 263 of the fixed link 260 and the partition wall 273 of the movable link 270. There is substantially no gap also between the fixed plate 264 of the fixed link 260 and the inner tube 271 of the movable link 270. Further, there is substantially no gap also between the outer tube 261 of the fixed link 260 and the inner tube 271 of the movable link 270. Accordingly, the movable link 270 cannot swing relative to the fixed link 260, around an axis perpendicular to the paper surface of FIG. 6. FIG. 6 is the sectional view perpendicular to a rotational axis of the drive shaft 267 of the fixed link 260.

Figure 7:
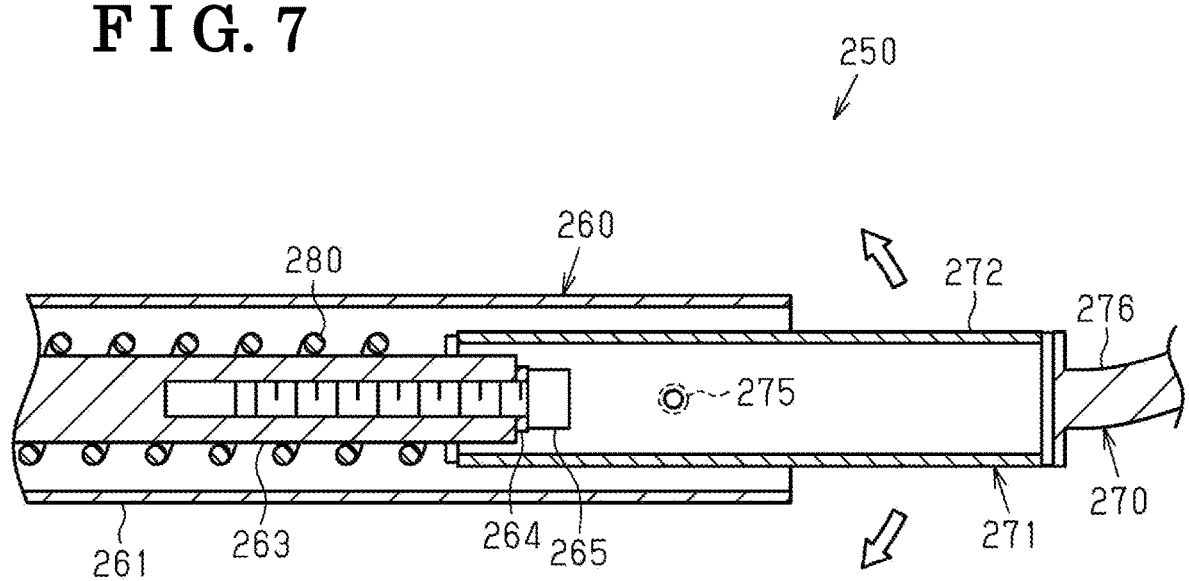
FIG. 7 is a sectional view of the sub-link mechanism.

Meanwhile, in a sectional view illustrated in FIG. 7, the partition wall 273 does not exist between the shaft body 263 of the fixed link 260 and the inner tube 271 of the movable link 270. In other words, a gap exists between the shaft body 263 of the fixed link 260 and a proximal end portion end of the inner tube 271 of the movable link 270. A gap exists also between the fixed plate 264 of the fixed link 260 and the inner tube 271 of the movable link 270. Further, a gap exists also between the outer tube 261 of the fixed link 260 and the inner tube 271 of the movable link 270. Accordingly, as indicated by the white arrows, the movable link 270 can swing relative to the fixed link 260 around an axis perpendicular to the paper surface of FIG. 7, specifically around the axis of the guide pin 275. However, a range in which the movable link 270 can swing is limited. FIG. 7 is the sectional view perpendicular to the axis of the guide pin 275.

As illustrated in FIG. 4 and FIG. 5, the extension portion 276 includes a fixed flange 277 that is fixed to the partition wall 274 of the inner tube 271, and a coupling shaft 278 that extends from the fixed flange 277. The fixed flange 277 extends, in a flange shape, from a proximal end portion of the coupling shaft 278. The fixed flange 277 includes a second socket 279 at a distal end portion thereof. Similarly to the first socket 231, the second socket 279 is a ball socket constituting a ball joint.

As illustrated in FIG. 6 and FIG. 7, the coil spring 280 is arranged between the outer tube 261 and the shaft body 263 of the fixed link 260, in a state of being compressed between the bottom wall 262 of the fixed link 260 and the partition wall 273 of the movable link 270. The coil spring 280 always biases the movable link 270, regardless of a position of the movable link 270.

As described above, in the sub-link mechanism 250, the fixed link 260 supports the movable link 270 in such a way as to be able to expand and contract in an axial direction of the fixed link 260. The fixed link 260 supports the movable link 270 in such a way as to be able to swing around the axis extending in a direction perpendicular to the axial direction of fixed link 260. In this regard, it can be said that the sub-link mechanism 250 can expand and contract, and also bend.

<Bracket 30>

As illustrated in FIG. 4, the bracket 30 includes a first bracket 31 that is fixed to the vehicle body 20, and a second bracket 32 that is fixed to the first bracket 31. The first bracket 31 and the second bracket 32 sandwich, between themselves, the driven gear 223 of the main link mechanism 210 and the drive gear 268 of the sub-link mechanism 250, and thereby, rotatably support the proximal end portion of the main link mechanism 210 and the proximal end portion of the sub-link mechanism 250. In other words, the bracket 30 rotatably supports the driven shaft 222 of the main link mechanism 210 and the drive shaft 267 of the sub-link mechanism 250. In this case, the rotational axes of the driven shaft 222 and the drive shaft 267 are directed in the same direction, and the driven gear 223 of the main link mechanism 210 and the drive gear 268 of the sub-link mechanism 250 mesh with each other. Accordingly, when the drive gear 268 rotates, the driven gear 223 rotates. In this embodiment, a change gear ratio between the drive gear 268 and the driven gear 223 is "2". For example, the driven gear 223 rotates by "20 degrees" while the drive gear 268 rotates by "10 degrees".

As illustrated in FIG. 1 and FIG. 2, a fixed position of the bracket 30 is closer to an upper end of the door opening 23 than to a lower end of the door opening 23 in the un-down direction. The bracket 30 is fixed to the rear pillar 22 in such a way that the rotational axes of the driven shaft 222 and the drive shaft 267 are directed in the width direction. Accordingly, the axes around which the main link mechanism 210 and the sub-link mechanism 250 rotate relative to the vehicle body 20 extend in the width direction.

<Stay 50>

As illustrated in FIG. 4, the stay 50 includes a base plate 51 that has a flat-plate shape, and a first protrusion portion 52 and a second protrusion portion 53 that protrude from the base plate 51. The first protrusion portion 52 includes a first ball 54 at a distal end thereof, and the second protrusion portion 53 includes a second ball 55 at a distal end thereof. The first ball 54 and the second ball 55 are each spherical. The first ball 54 is accommodated in the first socket 231 of the second link 230, and the second ball 55 is accommodated in the second socket 279 of the movable link 270. In this manner, the first socket 231 and the first ball 54 constitute a ball joint, and the second socket 279 and the second ball 55 constitute a ball joint. Thus, the stay 50 supports the distal end portion of the main link mechanism 210 and the distal end portion of the sub-link mechanism 250 in such a way as to be rotatable in any direction.

As illustrated in FIG. 1 and FIG. 2, the stay 50 is fixed to a side portion of the back door 40, at a position between the proximal end portion and the distal end portion of the back door 40. In this case, the first ball 54 is located closer to the distal end portion of the back door 40 than the second ball 55 is.

As illustrated in FIG. 4, in the following description, a distance between a coupling point at which the main link mechanism 210 and the vehicle body 20 are coupled to each other and a coupling point at which the main link mechanism 210 and the back door 40 are coupled to each other is referred to as "a distance Lm between the coupling points of the main link mechanism 210". Specifically, a distance Lm between the coupling points of the main link mechanism 210 is a distance between the coupling point at which the first link 220 of the main link mechanism 210 and the bracket 30 of the vehicle body 20 are coupled to each other and a coupling point at which the second link 230 of the main link mechanism 210 and the stay 50 of the back door 40 are coupled to each other. Herein, the coupling point between the first link 220 and the bracket 30 corresponds to an axis of the driven shaft 222 of the first link 22, and the coupling point between the second link 230 and the stay 50 corresponds to a center of the first socket 231 of the second link 230.

A distance between a coupling point at which the sub-link mechanism 250 and the vehicle body 20 are coupled to each other and a coupling point at which the sub-link mechanism 250 and the back door 40 are coupled to each other is referred to as "a distance Ls between the coupling points of the sub-link mechanism 250". Specifically, a distance Ls between the coupling points of the sub-link mechanism 250 is a distance between the coupling point at which the fixed link 260 of the sub-link mechanism 250 and the bracket 30 of the vehicle body 20 are coupled to each other and the coupling point at which the movable link 270 of the sub-link mechanism 250 and the stay 50 of the back door 40 are coupled to each other. Herein, the coupling point between the fixed link 260 and the bracket 30 corresponds to the axis of the drive shaft 267 of the fixed link 260, and the coupling point between the movable link 270 and the stay 50 corresponds to a center of the second socket 279 of the movable link 270.

As illustrated in FIG. 2, the coupling point between the main link mechanism 210 and the vehicle body 20 and the coupling point between the main link mechanism 210 and the back door 40 are offset from each other in the width direction. Specifically, the coupling point between the main link mechanism 210 and the vehicle body 20 is located closer to a center of the vehicle 10 than the coupling point between the main link mechanism 210 and the back door 40 is. Similarly, the coupling point between the sub-link mechanism 250 and the vehicle body 20 and the coupling point between the sub-link mechanism 250 and the back door 40 are offset from each other in the width direction. Specifically, the coupling point between the sub-link mechanism 250 and the vehicle body 20 is located closer to the center of the vehicle 10 than the coupling point between the sub-link mechanism 250 and the back door 40 is. In this regard, in this embodiment, the longitudinal direction of the main link mechanism 210 and a longitudinal direction of the sub-link mechanism 250 are inclined from the up-down direction, and are non-perpendicular to the width direction.

<Effect of This Embodiment>

With reference to FIG. 8 to FIG. 14, the following describes a manner when the back door 40 is opened from the fully closing position to the fully opening position.

Figure 8:
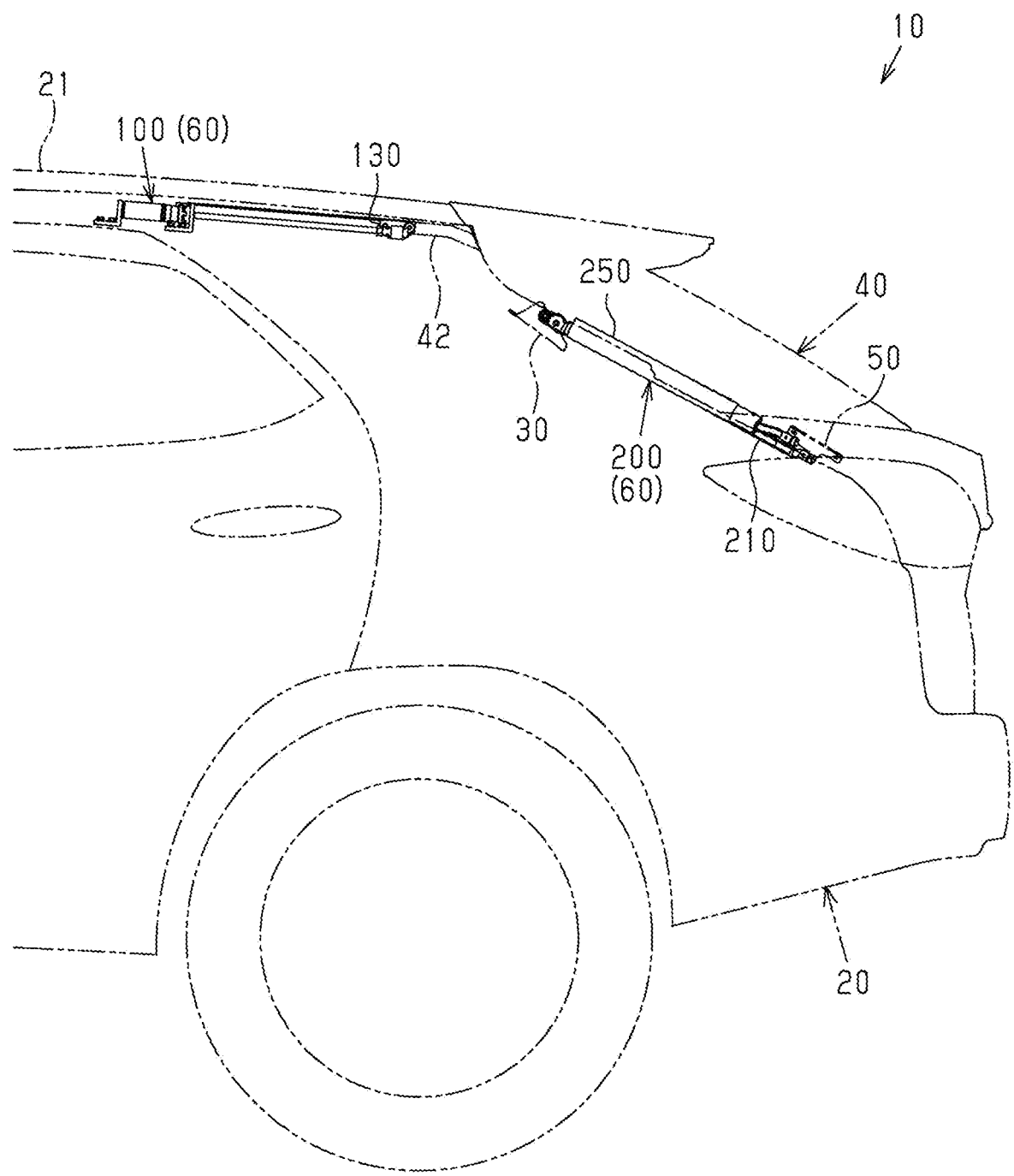
FIG. 8 is a side view of the vehicle rear portion when a back door is at a fully closing position.
Figure 9:
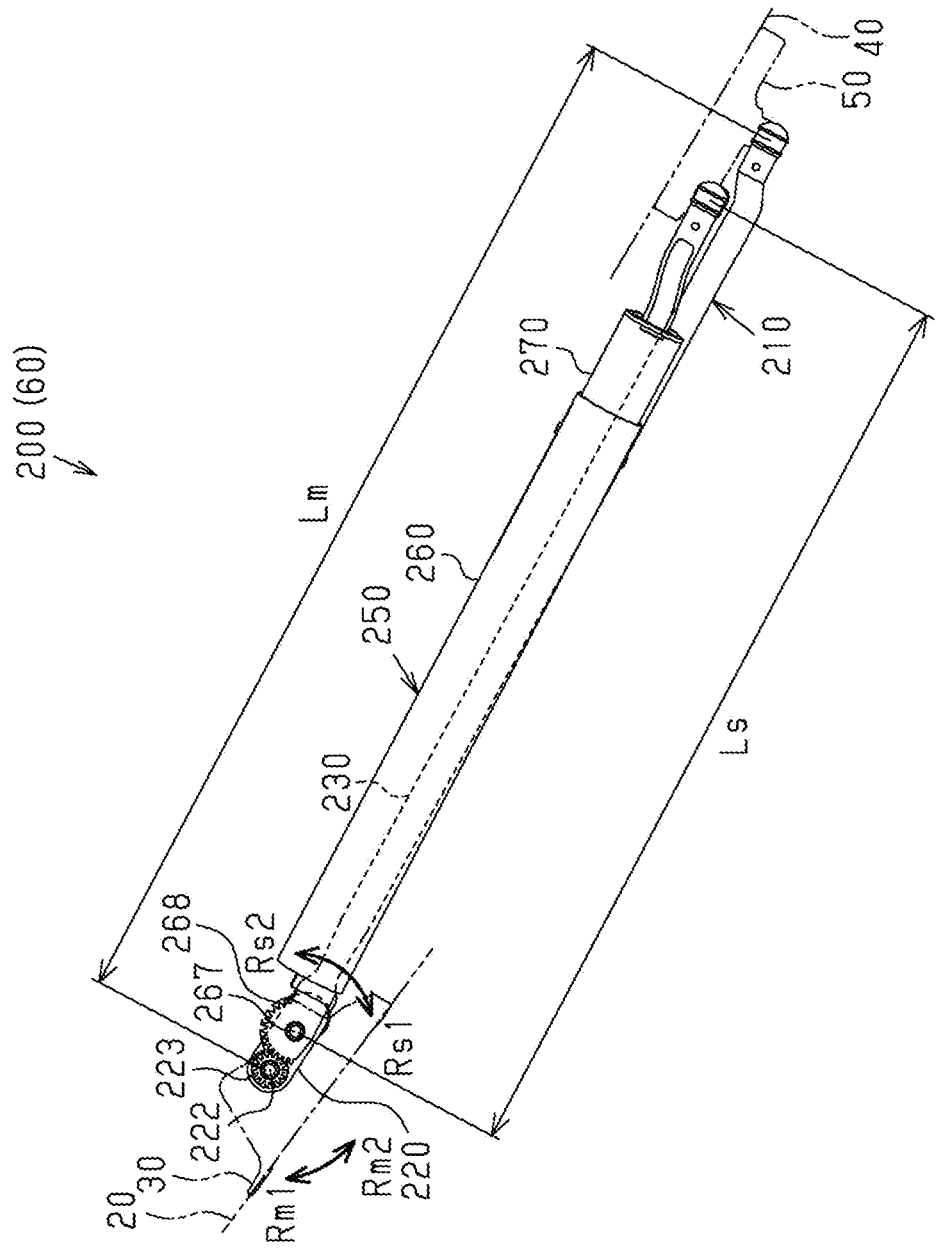
FIG. 9 is an enlarged view of the positioning mechanism illustrated in FIG. 8.

FIG. 8 is a diagram illustrating a rear portion of the vehicle 10 when the back door 40 is at the fully closing position, and FIG. 9 is a diagram of the positioning mechanism 200 extracted from FIG. 8. As illustrated in FIG. 8, the slider 130 of the drive mechanism 100 is at a position that corresponds to the full closing and that is near a rear end of the guide rail 140. Accordingly, the back door 40 is at the fully closing position.

As illustrated in FIG. 9, when the back door 40 is at the fully closing position, the sub-link mechanism 250 has rotated most in a first rotational direction Rs1. Accordingly, the drive gear 268 of the sub-link mechanism 250 has rotated most in the first rotational direction Rs1, and the driven gear 223 of the main link mechanism 210 has rotated most in a second rotational direction Rm2. At this time, the main link mechanism 210 extends substantially linearly. In other words, in the main link mechanism 210, a longitudinal direction of the first link 220 and a longitudinal direction of the second link 230 are directed in substantially the same direction. At this time, in the main link mechanism 210, a coupling point between the first link 220 and the second link 230 is at a position between the coupling point at which the first link 220 and the vehicle body 20 are coupled to each other and the coupling point at which the second link 230 and the back door 40 are coupled to each other. As a result, a distance Lm between the coupling points of the main link mechanism 210 has become the longest.

Figure 10:
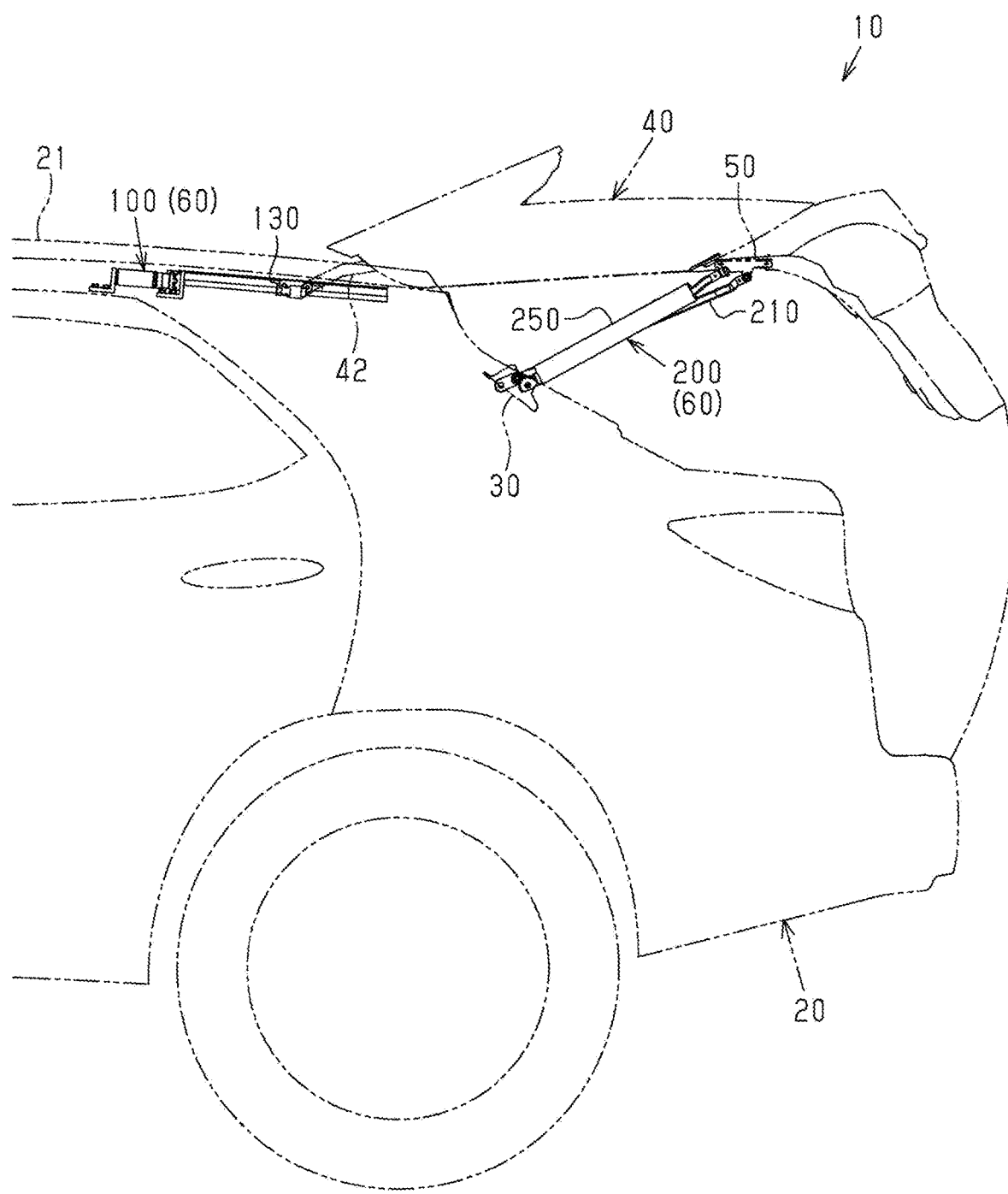
FIG. 10 is a side view of the vehicle rear portion when the back door is at an intermediate position.

As illustrated in FIG. 10, when the slider 130 moves to a front side along the guide rail 140 from the position corresponding to the full closing, the proximal end portion of the back door 40 is pulled to a front side. At this time, the back door 40 rotates around a rotational axis passing through the proximal end portion thereof in the width direction, while moving to a front side. In this manner, the movement of the slider 130 to a front side causes the back door 40 to be opened.

Figure 11:
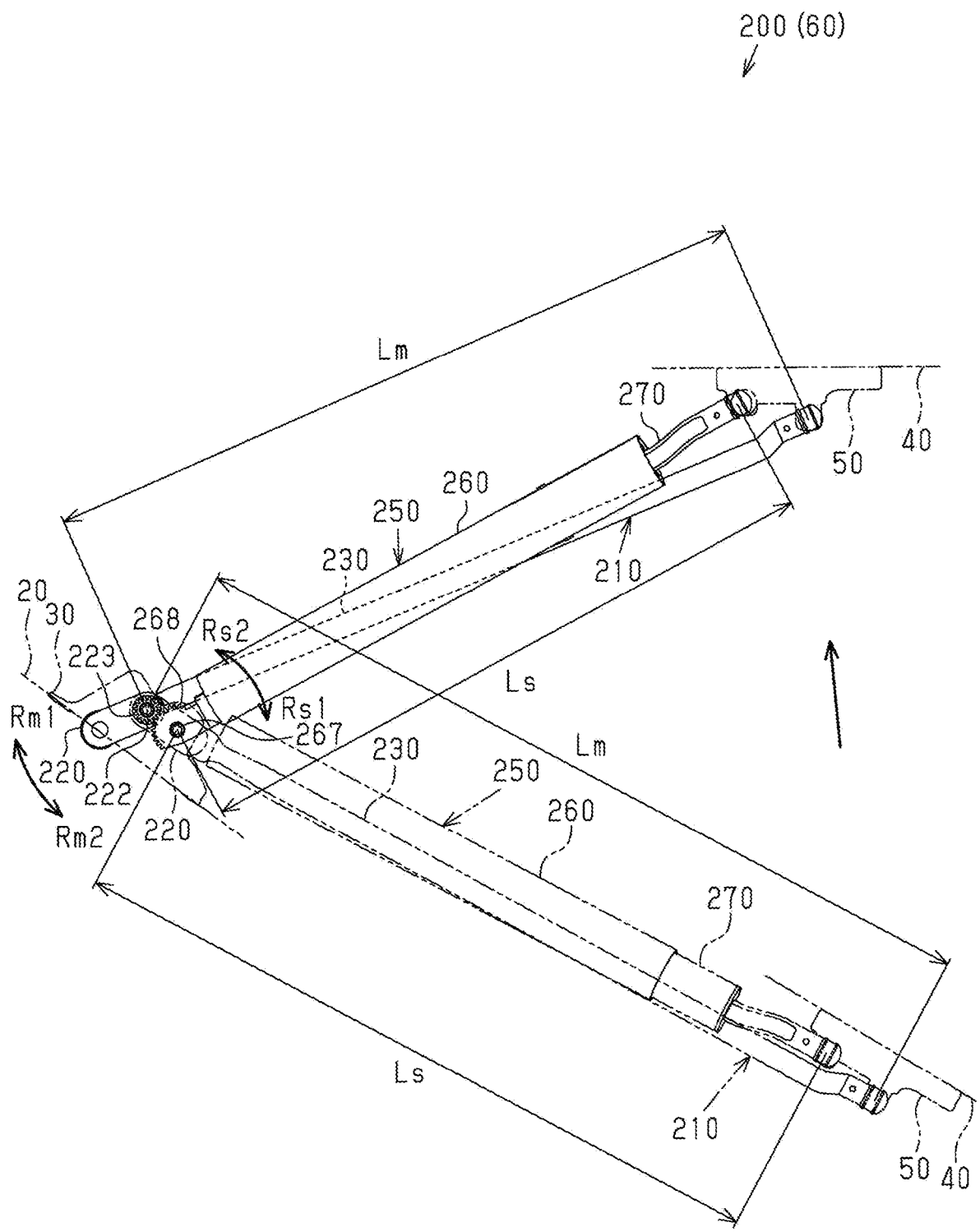
FIG. 11 is an enlarged view of the positioning mechanism illustrated in FIG. 10.

As illustrated in FIG. 11, when the back door 40 is opened from the fully closing position, the sub-link mechanism 250 rotates around the drive shaft 267 in the second rotational direction Rs2, accompanying the opening movement of the back door 40. In other words, the drive gear 268 of the sub-link mechanism 250 rotates in the second rotational direction Rs2. In this case, the driven gear 223 included in the main link mechanism 210 and meshing with the drive gear 268 rotates in a first rotational directional Rm1, and thus, the first link 220 rotates around the axis of the driven shaft 222 in the first rotational direction Rm1.

When the first link 220 rotates in the first rotational direction Rm1, the coupling point between the first link 220 and the second link 230 moves to a front side of the driven shaft 222 while drawing an arc. As a result, the stay 50 of the back door 40 moves not only to an upper side but also to a front side, as indicated by the solid arrow in FIG. 11. Thus, when the back door 40 is opened from the fully closing position, a rearward overhang of the back door 40 becomes less.

In the following description, a position of the slider 130 illustrated in FIG. 10 is referred to as a position corresponding to an intermediacy, and a position of the back door 40 illustrated in FIG. 10 is referred to as an intermediate position. The intermediate position is a position between the fully closing position and the fully opening position. As illustrated in FIG. 10 and FIG. 11, when the back door 40 is at the intermediate position, the main link mechanism 210 extends linearly. In other words, in the main link mechanism 210, the longitudinal direction of the first link 220 and the longitudinal direction of the second link 230 are directed in the same direction. At this time, differently from the case illustrated in FIG. 9, the coupling point between the first link 220 and the vehicle body 20 is at a position between the coupling point where the first link 220 and the second link 230 are coupled to each other and the coupling point between the second link 230 and the back door 40 are coupled to each other. As a result, a distance Lm between the coupling points of the main link mechanism 210 becomes the shortest. Thus, when the back door 40 moves between the fully closing position and the intermediate position, a distance Lm between the coupling points of the main link mechanism 210 becomes shorter as a door opening degree becomes larger. As a door opening degree becomes larger, a distance Lm between the coupling points of the main link mechanism 210 becomes shorter, and thereby, the stay 50 moves to a front side more than the case where a distance Lm between the coupling points does not become shorter.

A door opening degree corresponding to the intermediate position can be set arbitrarily. For example, in the case where a door opening degree when the back door 40 is at the fully closing position is "0%", and a door opening degree when the back door 40 is at the fully opening position is "100%", a door opening degree when the back door 40 is at the intermediate position may be "50%". Alternatively, a door opening degree when the back door 40 is at the intermediate position may be larger than "50%" or smaller than "50%".

Figure 12:
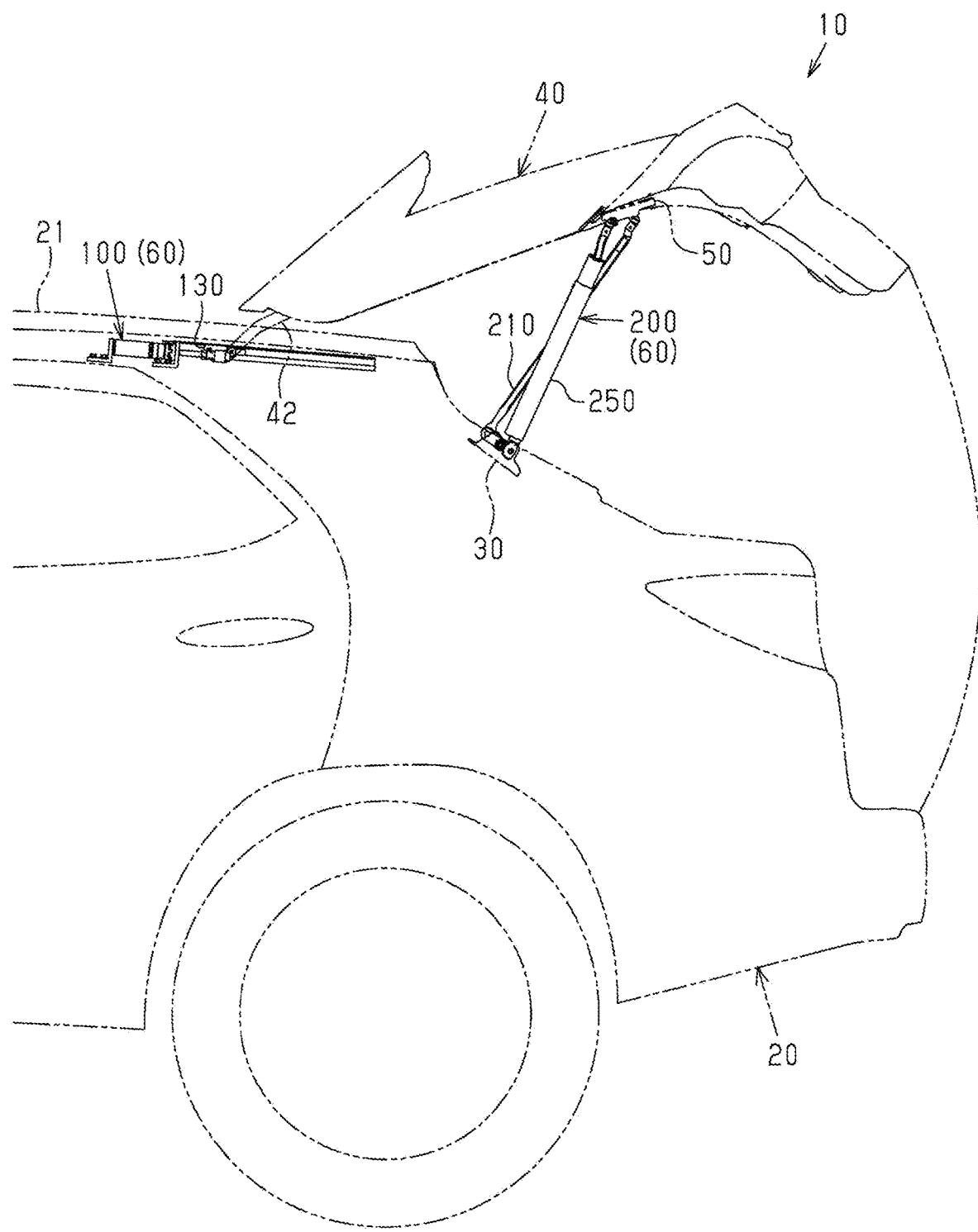
FIG. 12 is a side view of the vehicle rear portion when the back door is at a fully opening position.

As illustrated in FIG. 12, when the slider 130 moves along the guide rail 140 to a front side from the position corresponding to the intermediacy, the proximal end portion of the back door 40 is further pulled to a front side. At this time, the back door 40 rotates around the rotational axis passing through the proximal end portion thereof in the width direction, while moving to a front side. In this manner, the movement of the slider 130 to a front side causes the back door 40 to be opened.

Figure 13:
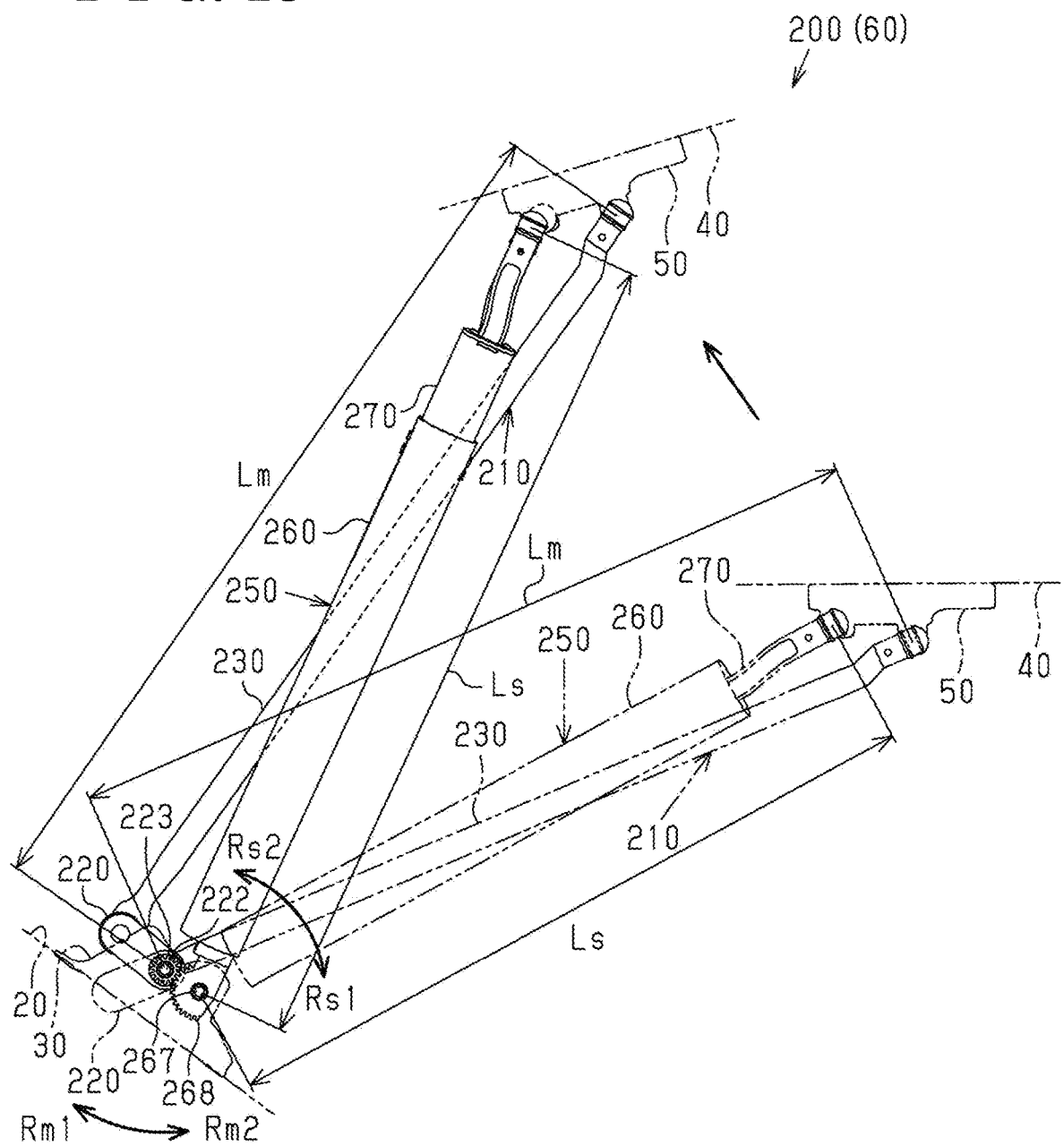
FIG. 13 is an enlarged view of the positioning mechanism illustrated in FIG. 12.

As illustrated in FIG. 13, when the back door 40 is opened from the intermediate position, the sub-link mechanism 250 rotates around the drive shaft 267 in the second rotational direction Rs2, accompanying the opening movement of the back door 40. In other words, the drive gear 268 of the sub-link mechanism 250 rotates in the second rotational direction Rs2. In this case, the driven gear 223 included in the main link mechanism 210 and meshing with the drive gear 268 rotates in the first rotational direction Rm1, and thus, the first link 220 rotates around the axis of the driven shaft 222 in the first rotational direction Rm1.

When the first link 220 rotates in the first rotational direction Rm1, the coupling point between the first link 220 and the second link 230 moves to an upper side of the driven shaft 222 while drawing an arc. As a result, the stay 50 of the back door 40 moves not only to a front side but also to an upper side, as indicated by the solid arrow in FIG. 13. Thus, when the back door 40 is opened from the fully closing position, the back door 40 easily moves upward.

In the following description, a position of the slider 130 illustrated in FIG. 12 is referred to as a position corresponding to the full opening. As illustrated in FIG. 12 and FIG. 13, when the back door 40 is at the fully opening position, an angle made between the longitudinal direction of the first link 220 and the longitudinal direction of the second link 230 in the main link mechanism 210 is approximately 90 degrees. As a result, a distance Lm between the coupling points of the main link mechanism 210 is shorter than that when the back door 40 is at the fully closing position, and is longer than that when the back door 40 is at the intermediate position. In this manner, when the back door 40 moves between the intermediate position and the fully opening position, a distance Lm between the coupling points of the main link mechanism 210 becomes longer as a door opening degree becomes larger. A distance Lm between the coupling points of the main link mechanism 210 becomes longer as a door opening degree becomes larger, and thereby, the stay 50 moves upward more than the case where a distance Lm between the coupling points does not become longer.

As illustrated in FIG. 2, the coupling point between the sub-link mechanism 250 and the vehicle body 20 and the coupling point between the sub-link mechanism 250 and the back door 40 are offset from each other in the width direction. The coupling point between the sub-link mechanism 250 and the vehicle body 20 and the coupling point between the sub-link mechanism 250 and the back door 40 are each immovable in the width direction. Accordingly, when the back door 40 is opened and closed, a distance Ls between the coupling points of the link mechanism 250 changes without a change in width-direction interval between the coupling point at which the sub-link mechanism 250 and the vehicle body 20 are coupled to each other and the coupling point at which the sub-link mechanism 250 and the back door 40 are coupled to each other.

Herein, when the sub-link mechanism 250 can be tilted relative to the up-down direction at the time of the opening and closing movements of the back door 40, mere expansion and contraction of the sub-link mechanism 250 can deal with a change in a distance Ls between the coupling points of the sub-link mechanism 250. However, the proximal end portion of the sub-link mechanism 250 is allowed to only rotate around the axis extending in the width direction, and thus, the sub-link mechanism 250 cannot be tilted relative to the up-down direction. In view of it, at the time of the opening and closing movements of the back door 40, the sub-link mechanism 250 allows the movable link 270 to expand and contract and swing relative to the fixed link 260, and thereby deals with a change in a distance Ls between the coupling points of the sub-link mechanism 250. The following describes the details.

Figure 14:
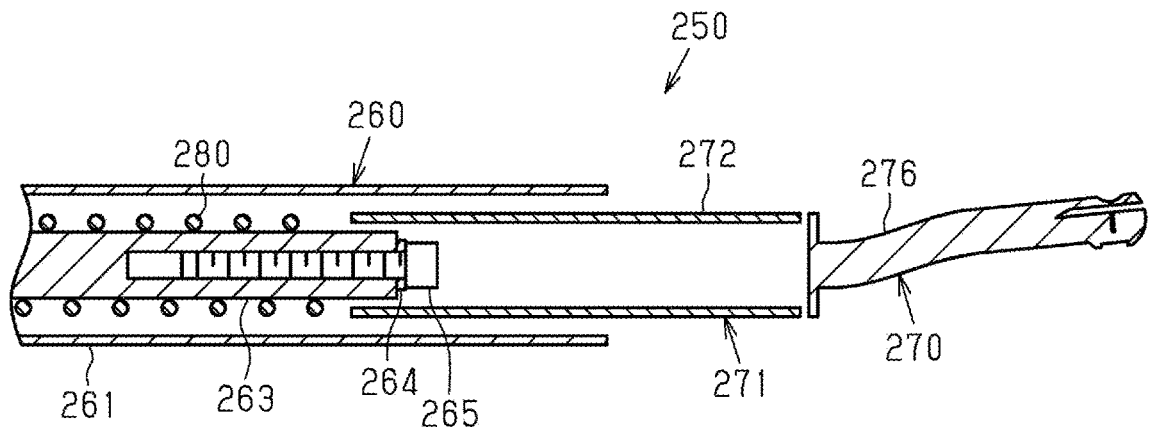
FIG. 14 is a sectional view of the sub-link mechanism when the back door is at the fully closing position.

As illustrated in FIG. 8 and FIG. 9, when the back door 40 is at the fully closing position, a distance Ls between the coupling points of the sub-link mechanism 250 is longer. At this time, as illustrated in FIG. 14, in the sub-link mechanism 250, the movable link 270 is not tilted from the fixed link 260. In other words, the axis of the fixed link 260 and the axis of the movable link 270 are on the same straight line.

Figure 15:
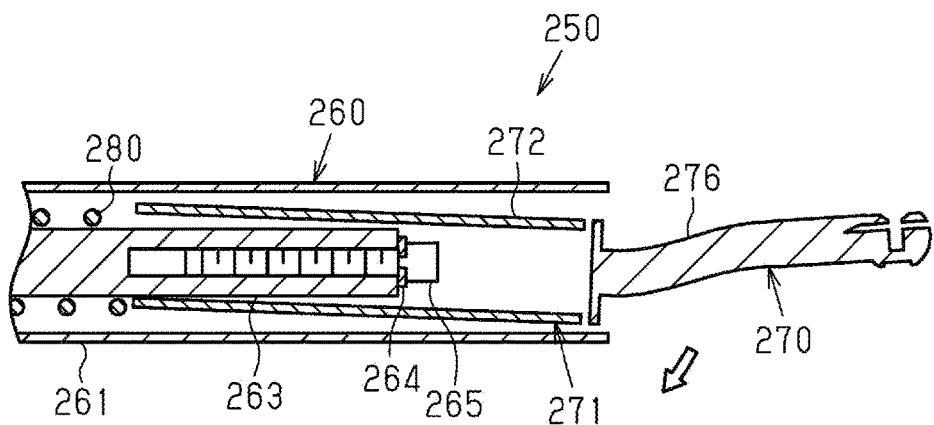
FIG. 15 is a sectional view of the sub-link mechanism when the back door is positioned at the intermediate position.

As illustrated in FIG. 10 and FIG. 11, when the back door 40 is opened from the fully closing position to the intermediate position, a distance Ls between the coupling points of the sub-link mechanism 250 gradually decreases. In other words, as illustrated in FIG. 14 and FIG. 15, the fixed link 260 moves in the direction of compressing the coil spring 280. Further, when the back door 40 is opened from the fully closing position to the intermediate position, the movable link 270 is tilted from the fixed link 260. Specifically, the axis of the movable link 270 is tilted from the axis of the fixed link 260. In this manner, the sub-link mechanism 250 can contract while maintaining the width direction interval between the coupling point thereof to the vehicle body 20 and the coupling point thereof to the back door 40.

Figure 16:
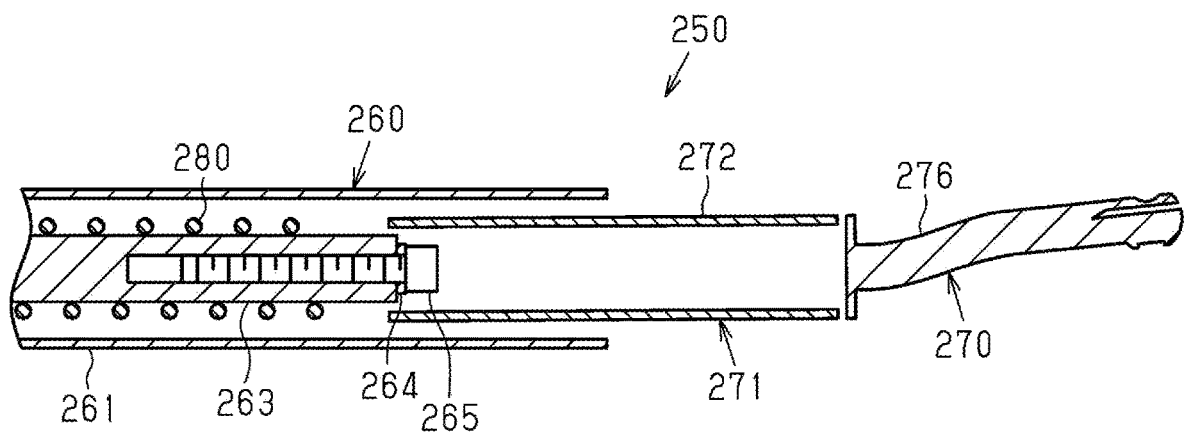
FIG. 16 is a sectional view of the sub-link mechanism when the back door is at the fully opening position.

As illustrated in FIG. 12 and FIG. 13, when the back door 40 is opened from the intermediate position to the fully opening position, a distance Ls between the coupling points of the sub-link mechanism 250 gradually increases. In other words, as illustrated in FIG. 15 and FIG. 16, the movable link 270 moves in the direction of projecting out from the fixed link 260. Further, when the back door 40 is opened from the intermediate position to the fully opening position, a tilt of the movable link 270 from the fixed link 260 gradually decreases to zero. In this manner, the sub-link mechanism 250 can expand while maintaining the width-direction interval between the coupling point thereof to the vehicle body 20 and the coupling point thereof to the back door 40.

As illustrated in FIG. 9 and FIG. 13, when the back door 40 is at the fully opening position, a distance Ls between the coupling points of the sub-link mechanism 250 is longer, similarly to the case where the back door 40 is at the fully closing position. Accordingly, as illustrated in FIG. 14 and FIG. 16, when the back door 40 is at the fully opening position, no tilt of the movable link 270 from the fixed link 260 occurs similarly to the case where the back door 40 is at the fully closing position.

The movements of a plurality of the constituent components of the door opening and closing device 60 are described in turn in the above description of the effects of this embodiment in order to facilitate understanding of the description, but to be precise, a plurality of the constituent components of the door opening and closing device 60 simultaneously move while cooperating with one another. In other words, in this embodiment, the vehicle body 20, the back door 40, the slider 130 of the drive mechanism 100, the first link 220 and second link 230 of the main link mechanism 210, and the fixed link 260 and movable link 270 of the sub-link mechanism 250 constitute a mechanism whose degree of freedom is "1".

<Effects of This Embodiment>

(1) The slider 130 is movable in the front-rear direction, in a state of supporting the proximal end portion of the back door 40 in such a way as to be rotatable around the axis extending in the width direction. Thus, when a contact point between the back door 40 and the vehicle body 20 is only the slider 130, a posture of the back door 40 becomes unstable depending on a door opening degree. In this regard, the door opening and closing device 60 includes the main link mechanism 210 coupling the vehicle body 20 and the back door 40 to each other, and thus, a posture of the back door 40 is determined depending on a door opening degree. Further, when the back door 40 is opened from the fully closing position, a distance Lm between the coupling points of the main link mechanism 210 gradually decreases as a door opening degree becomes larger. Accordingly, by the main link mechanism 210, a rearward movement of the back door 40 becomes less. As a result, the back door 40 less overhangs in a direction of being separated from the door opening 23. Thus, the door opening and closing device 60 can suppress an overhang of the back door 40.

(2) When a distance Lm between the coupling points of the main link mechanism 210 decreases as a door opening degree becomes larger, an opened amount of the door opening 23 in the up-down direction tends to be smaller when the back door 40 reaches the fully opening position. In this regard, when the back door 40 moves between the fully closing position and the intermediate position, the door opening and closing device 60 decreases a distance Lm between the coupling points of the main link mechanism 210 as a door opening degree becomes larger. Thus, it is possible to suppress a rearward overhang of the back door 40 when the back door 40 is opened and closed near the fully closing position. Further, when the back door 40 moves between the intermediate position and the fully opening position, the door opening and closing device 60 increases a distance Lm between the coupling points of the main link mechanism 210 as a door opening degree becomes larger. Thus, it is possible to increase an opened amount of the door opening 23 in the up-down direction when the back door 40 is at the fully opening position. As illustrated in FIG. 10 and FIG. 12, an overhang of the back door 40 becomes a problem mainly when the back door 40 moves between the fully closing position and the vicinity of the intermediate position.

(3) The door opening and closing device 60 causes the first link 220 to rotate depending on a door opening degree, and thereby, can change a distance Lm between the coupling points of the main link mechanism 210. In other words, the door opening and closing device 60 can adjust an overhang of the back door 40 by the rotation of the first link 220.

(4) An amount of rotation of the sub-link mechanism 250 around the coupling point thereof to the vehicle body 20 changes depending on a door opening degree. The sub-link mechanism 250 rotates the first link 220, based on the rotation around the coupling point thereof to the vehicle body 20. In this manner, the door opening and closing device 60 can rotate the first link 220, depending on a door opening degree. For example, the door opening and closing device 60 does not need to include an actuator that rotates the first link 220, depending on a door opening degree, and in this regard, complication of the device can be suppressed.

(5) The main link mechanism 210 includes the driven gear 223 rotating around the rotational axis relative to the vehicle body 20, and the sub-link mechanism 250 includes the drive gear 268 rotating around the rotational axis relative to the vehicle body 20, in a state of meshing with the driven gear 223. Thus, the door opening and closing device 60 can implement, by the two gears, power transmission between the main link mechanism 210 and the sub-link mechanism 250.

(6) When the back door 40 is at the fully opening position, the coil spring 280 of the sub-link mechanism 250 biases the movable link 270 in the direction in which a distance Ls between the coupling points of the sub-link mechanism 250 expands. In other words, restoring force of the coil spring 280 acts in the direction of opening the back door 40. Thus, the door opening and closing device 60 can hold the back door 40 at the fully opening position even when power of the actuator 110 is turned off.

(7) In the sub-link mechanism 250, the movable link 270 can swing relative to the fixed link 260. Thus, even when the coupling point between the sub-link mechanism 250 and the vehicle body 20 and the coupling point between the sub-link mechanism 250 and the back door 40 are offset from each other in the width direction, the door opening and closing device 60 can expand and contract the sub-link mechanism 250 without a load being applied to the sub-link mechanism 250.

(8) In the door opening and closing device 60, the actuator 110 is installed in the roof 21. Thus, a space for installing the actuator 110 is more easily secured.

<Modified Examples>

This embodiment can be modified and implemented as in the following. This embodiment and the following modified examples can be implemented in combination with each other within a range where technical contradiction does not occur.

The drive mechanism 100 does not need to include the actuator 110 driving the back door 40. In this case, the back door 40 is a door that is manually opened and closed by a user.

Figure 17:
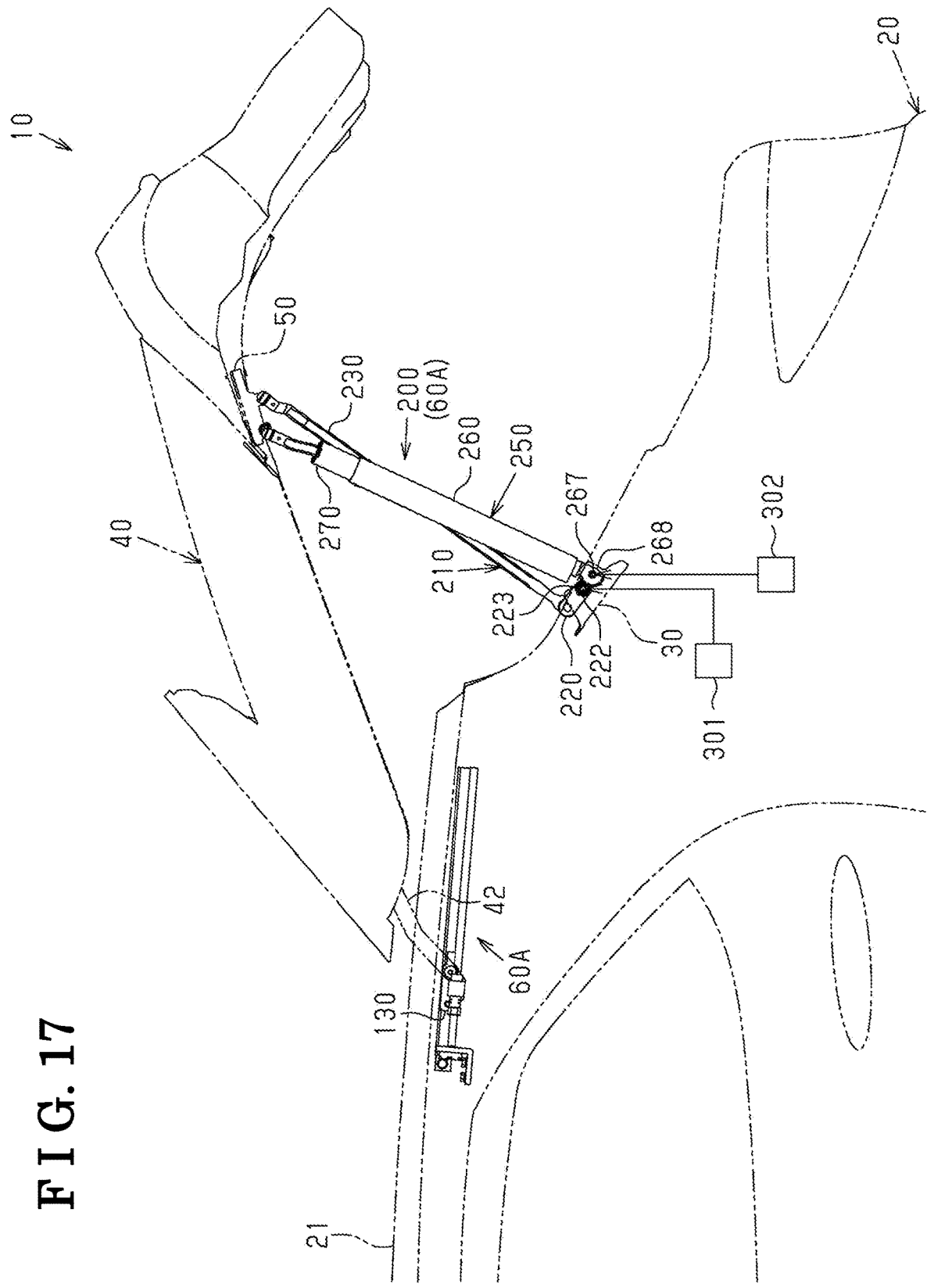
FIG. 17 is a side view of a vehicle rear portion in a modified example.

The actuator 110 of the door opening and closing device 60 may be an actuator that drives the movable component other than the slider 130. For example, as illustrated in FIG. 17, the door opening and closing 60 may be a door opening and closing device 60A that includes an actuator 301 or an actuator 302 instead of the actuator 110.

The actuator 301 corresponds to "a main actuator", and rotates the first link 220 of the main link mechanism 210 around the coupling point thereof to the vehicle body 20. The actuator 301 preferably includes a motor and a transmission mechanism that transmits rotation of an output shaft of the motor to the driven gear 223 of the first link 220. The actuator 302 corresponds to "a sub-actuator", and rotates the fixed link 260 of the sub-link mechanism 250 around the coupling point thereof to vehicle body 20. The actuator 302 preferably includes a motor and a transmission mechanism that transmits rotation of an output shaft of the motor to the drive gear 268 of fixed link 260.

According to this modified example, the first link 220 or the fixed link 260 is driven by the actuator 301 or 302, and thereby, the back door 40 can be opened and closed. According to this modified example, the actuator 301 or 302 can be installed near the driven gear 223 or the drive gear 268, and in this regard, a space occupied by the actuator 110 is reduced in the roof 21. This modified example can improve a degree of freedom in design by avoiding interference with other devices such as a sunroof device. The actuator 301 may directly drive the driven shaft 222, and the actuator 302 may directly drive the drive shaft 267. According to this, the above-described transmission mechanisms are unnecessary, and in this regard, the number of components of the door opening and closing device 60A can be reduced.

In the door opening and closing device 60, in the case of omitting the actuator 110, the sub-link mechanism 250 may be an electric cylinder that can expand and contract. In this case, expanding and contracting the electric cylinder can cause the back door 40 to be opened and closed. In this modified example, the electric cylinder is a drive source for the back door 40, and in this regard, a space occupied by the actuator 110 is reduced in the roof 21. This modified example can improve a degree of freedom in design by avoiding interference with other devices such as a sunroof device. One example of such an electric cylinder is disclosed in JP2015-161157A.

The door opening and closing device 60 may include a plurality of actuators driving a plurality of the respective movable components of the door opening and closing device 60. For example, the door opening and closing device 60 may include two or more actuators among the actuator 110 in the above-described embodiment and the actuators 301 and 302 and the electric cylinder in the modified examples. In this case, the door opening and closing device 60 preferably uses a plurality of the actuators. In this modified example, the back door 40 can be opened and closed by simultaneously driving a plurality of the actuators. Accordingly, in this modified example, output required for each of the actuators is reduced, and in this regard, it is possible to suppress an increase in size of each of the actuators and an increase in space occupied by each of the actuators. This modified example can improve a degree of freedom in design by avoiding interference with other devices such as a sunroof device.

In the drive mechanism 100, the actuator 110 may further include a clutch that switches a state of power transmission between the output shaft of the electric motor 111 and the linear motion mechanism 120. The actuator 110 preferably disengages the clutch when a user manually opens and closes the back door 40. According to this, a user can open and close the back door 40, with small operating force.

Instead of including the first link 220 and the second link 230, the main link mechanism 210 may include a cam that is rotatably supported by the vehicle body 20, and a driven link whose one end slides on a cam surface of the cam and whose opposite end is rotatably supported by the back door 40. In this case, a distance Lm between the coupling points of the main link mechanism 210 can be changed by rotating the cam, depending on rotation of the sub-link mechanism 250.

The positioning mechanism 200 does not need to include the sub-link mechanism 250. In this case, instead of including the first link 220 and the second link 230, the main link mechanism 210 preferably includes an electric cylinder that can expand and contract, a control device that controls the electric cylinder, depending on a door opening degree, and an opening degree sensor that detects a door opening degree. When the back door 40 moves between the fully closing position and the intermediate position, the control device causes the electric cylinder to be contracted as a door opening degree becomes larger. Meanwhile, when the back door 40 moves between the intermediate position and the fully opening position, the control device causes the electric cylinder to be expanded as a door opening degree becomes larger.

In the positioning mechanism 200, the sub-link mechanism 250 does not need to include the coil spring 280. In this case, the positioning mechanism 200 preferably includes a biasing member that biases the slider 130 to a front side, a biasing member that biases the driven gear 223 of the main link mechanism 210 in the second rotational direction Rm2, and the like.

The sub-link mechanism 250 may be an alternative mechanism that rotates the driven gear 223 of the main link mechanism 210, depending on a door opening degree.

The alternative mechanism for the sub-link mechanism 250 may include a drum that is rotatably supported by the vehicle body 20, a cable whose one end is wound on the drum and whose opposite end is connected to the back door 40, and a spiral spring that biases the drum in a direction of winding the cable thereon. The drum preferably rotates the driven gear 223 of the main link mechanism 210, depending on a rotational amount thereof, similarly to the above-described drive gear 268.

The alternative mechanism for the sub-link mechanism 250 may be a mechanism that converts linear motion of the slider 130 in the front-rear direction into rotational motion of the driven gear 223 of the main link mechanism 210.

The coupling point of the sub-link mechanism 250 to the vehicle body 20 and the coupling point of the sub-link mechanism 250 to the back door 40 do not need to be offset from each other in the width direction. In this case, the sub-link mechanism 250 does not need to be configured in such a way that the movable link 270 is swingable relative to the fixed link 260.

The door opening 23 may be open in a side portion of the vehicle body 20, or may be open in a front portion of the vehicle body 20. The door opening and closing device 60 may be applied to a door that opens and closes such a door opening 23.

The door opening 23 does not need to be an opening for loading and unloading luggage. The door opening 23 may be an opening for a user to get on and off the vehicle 10.

When the vehicle body 20 includes a roof opening in the roof 21, the vehicle 10 may include a sunroof device that opens and closes the roof opening. For example, the sunroof device includes rails that extend in the front-rear direction on both sides of the roof opening, a movable panel that opens and closes the roof opening, and a functional component that moves along the rails and thereby opens and closes the movable panel. In this case, the rails of the sunroof device are preferably integrated with the guide rails 140 of the door opening and closing device 60. This modified example can reduce the number of components constituting the vehicle 10, as compared to the case where the rails of the sunroof device are separated from the guide rails 140 of the door opening and closing device 60.

The following describes a technical idea that can be understood from the above-described embodiment and modified examples.

The sub-link mechanism includes the fixed link that is rotatably coupled to the vehicle body, and the movable link that is rotatably coupled to the door and that is supported by the fixed link in such a way as to be able to expand and contract relative to the fixed link, and the fixed link swingably supports the movable link.

In the sub-link mechanism, the movable link can swing relative to the fixed link. Accordingly, even when the coupling point between the sub-link mechanism and the vehicle body and the coupling point between the sub-link mechanism and the back door are offset from each other in the width direction, the door opening and closing device can expand and contract the sub-link mechanism without a load being applied to the sub-link mechanism.

A door opening and closing device that solves the above-described problem is applied to a vehicle that includes a vehicle body and a door. The vehicle body includes a door opening. The door opens and closes the door opening. A part in the door corresponding to an upper end portion of the door opening when the door is at a fully closing position of fully closing the door opening is defined as a proximal end portion of the door. The door opening and closing device includes a slider and a main link mechanism. The slider moves along a roof of the vehicle body in a direction intersecting with a width direction of the door, in a state of supporting the proximal end portion of the door in such a way as to be rotatable around an axis extending in the width direction. The main link mechanism includes one end rotatably coupled to the vehicle body and an opposite end rotatably coupled to the door. The main link mechanism adjusts a posture of the door, depending on a door opening degree by changing a distance between coupling points that is a distance between the coupling point to the vehicle body and the coupling point to the door. The main link mechanism decreases the distance between the coupling points as the door opening degree becomes larger.

The slider is movable in the direction intersecting with the width direction, in a state of supporting the proximal end portion of the door in such a way as to be rotatable around the axis extending in the width direction. Thus, when a contact point between the door and the vehicle body is only the slider, a posture of the door becomes unstable depending on the door opening degree. In this regard, the door opening and closing device includes the main link mechanism that couples the vehicle body and the door to each other, and thus, a posture of the door is determined depending on the door opening degree. Further, when the door is opened from the fully closing position, the distance between the coupling points of the main link mechanism gradually decreases as the door opening degree becomes larger. Accordingly, by the main link mechanism, the door less overhangs in a direction of being separated from the door opening. Thus, the door opening and closing device can suppress an overhang amount of the door.

In the door opening and closing device, a position between the fully closing position and a fully opening position of fully opening the door opening may be defined as an intermediate position. When the door moves between the fully closing position and the intermediate position, the main link mechanism may decrease the distance between the coupling points as the door opening degree becomes larger.

In a case that the distance between the coupling points decreases as the door opening degree becomes larger, an opened amount of the door opening in an up-down direction tends to be smaller when the door reaches the fully opening position. In this regard, when the door moves between the fully closing position and the intermediate position, the door opening and closing device decreases the distance between the coupling points of the main link mechanism as the door opening degree becomes larger, and thereby, can suppress an overhang amount of the door.

In the door opening and closing device, when the door moves between the intermediate position and the fully opening position, the main link mechanism may increase the distance between the coupling points as the door opening degree becomes larger.

When the door moves between the intermediate position and the fully opening position, the door opening and closing device increases the distance between the coupling points of the main link mechanism as the door opening degree becomes larger, and thereby, can increase an opened amount of the door opening in the up-down direction.

In the door opening and closing device, the main link mechanism may include a first link that is rotatably coupled to the vehicle body, and a second link that is rotatably coupled to the door and is rotatably coupled to the first link. The first link may rotate around the coupling point to the vehicle body, thereby changing the distance between the coupling points of the main link mechanism.

The door opening and closing device causes the first link to rotate depending on the door opening degree, and thereby, can change the distance between the coupling points of the main link mechanism. In other words, the door opening and closing device can adjust an overhang amount of the door by rotation of the first link.

The door opening and closing device may include a sub-link mechanism that includes one end rotatably coupled to the vehicle body and an opposite end rotatably coupled to the door, and expands and contracts depending on the door opening degree. The sub-link mechanism may cause the first link to rotate around the coupling point to the vehicle body, depending on an amount of rotation around the coupling point to the vehicle body.

An amount of rotation of the sub-link mechanism around the coupling point to the vehicle body changes depending on the door opening degree. The sub-link mechanism causes the first link to rotate, based on rotation around the coupling point to the vehicle body. In this manner, the door opening and closing device can cause the first link to rotate, depending on the door opening degree. For example, the door opening and closing device does not need to include an actuator that causes the first link to rotate, depending on the door opening degree, and in this regard, complication of the device can be suppressed.

In the door opening and closing device, the main link mechanism may include a driven gear rotating around a rotational axis relative to the vehicle body. The sub-link mechanism may include a drive gear meshing with the driven gear and rotating around a rotational axis relative to the vehicle body.

The door opening and closing device can achieve, by the two gears, power transmission between the main link mechanism and the sub-link mechanism.

The door opening and closing device may include a sub-actuator that drives the sub-link mechanism. In the door opening and closing device, the sub-actuator may drive the sub-link mechanism to rotate around the coupling point between the sub-link mechanism and the vehicle body.

The door opening and closing device can open and close the door by driving the sub-link mechanism. The actuator can be easily installed near the sub-link mechanism, and in this regard, a space occupied by the actuator is reduced in the roof, as compared to a case where the actuator is installed in the roof.

The door opening and closing device may include a main actuator that drives the first link. In the door opening and closing device, the main actuator may drive the first link to rotate around the coupling point between the first link and the vehicle body.

The door opening and closing device can open and close the door by driving the first link. The actuator can be easily installed near the first link, and in this regard, a space occupied by the actuator can be reduced in the roof, as compared to a case where the actuator is installed in the roof.

The door opening and closing device may include a slider actuator that drives the slider in a direction intersecting with the width direction. The slider actuator may be installed in the roof.

The door opening and closing device can open and close the door by driving the slider. The slider actuator is installed in the roof, and in this regard, the door opening and closing device makes it easier to secure a space for installing the slider actuator.

In the door opening and closing device, the door opening may be open in a rear portion of the vehicle body. The door may be a back door.

The door opening and closing device can reduce a rearward overhang amount of the door when the back door is opened and closed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door opening and closing device being applied to a vehicle including a vehicle body that includes a door opening; and a door that opens and closes the door opening, a part in the door corresponding to an upper end portion of the door opening when the door is at a fully closing position of fully closing the door opening is defined as a proximal end portion of the door, the door opening and closing device comprising:
- a slider that moves along a roof of the vehicle body in a direction intersecting with a width direction of the door, in a state of supporting the proximal end portion of the door in such a way as to be rotatable around an axis extending in the width direction;
- a main link mechanism that includes one end rotatably coupled to the vehicle body and an opposite end rotatably coupled to the door, and adjusts a posture of the door, depending on a door opening degree by changing a distance between coupling points that is a distance between a coupling point to the vehicle body and a coupling point to the door; and
- a sub-link mechanism that includes one end rotatably coupled to the vehicle body and an opposite end rotatably coupled to the door, and expands and contracts depending on the door opening degree, wherein
- the main link mechanism decreases the distance between the coupling points as the door opening degree becomes larger,
- the main link mechanism includes a first link that is rotatably coupled to the vehicle body, and a second link that is rotatably coupled to the door and rotatably coupled to the first link,
- the first link rotates around the coupling point to the vehicle body, thereby changing the distance between the coupling points of the main link mechanism,
- the sub-link mechanism causes the first link to rotate around the coupling point to the vehicle body, depending on an amount of rotation around the coupling point to the vehicle body,
- the main link mechanism includes a driven gear rotating around a rotational axis relative to the vehicle body, and
- the sub-link mechanism includes a drive gear meshing with the driven gear and rotating around a rotational axis relative to the vehicle body.

2. The door opening and closing device according to claim 1, wherein,
- in a case that a position between the fully closing position and a fully opening position of fully opening the door opening is defined as an intermediate position,
- when the door moves between the fully closing position and the intermediate position, the main link mechanism decreases the distance between the coupling points as the door opening degree becomes larger.

3. The door opening and closing device according to claim 2, wherein,
- when the door moves between the intermediate position and the fully opening position, the main link mechanism increases the distance between the coupling points as the door opening degree becomes larger.

4. The door opening and closing device according to claim 1, further comprising
- a sub-actuator that drives the sub-link mechanism.

5. The door opening and closing device according to claim 4, wherein
- the sub-actuator drives the sub-link mechanism to rotate around a coupling point between the sub-link mechanism and the vehicle body.

6. The door opening and closing device according to claim 1, further comprising
- a main actuator that drives the first link.

7. The door opening and closing device according to claim 6, wherein
- the main actuator drives the first link to rotate around a coupling point between the first link and the vehicle body.

8. The door opening and closing device according to claim 1, further comprising
- a slider actuator that drives the slider in a direction intersecting with the width direction, wherein
- the slider actuator is installed in the roof.

9. The door opening and closing device according to claim 1, wherein
- the door opening is open in a rear portion of the vehicle body, and
- the door is a back door.

* * * * *